US007499593B2

(12) United States Patent
Yamaguchi

(10) Patent No.: US 7,499,593 B2
(45) Date of Patent: Mar. 3, 2009

(54) VIDEO DECODING APPARATUS

(75) Inventor: Satoshi Yamaguchi, Osaka (JP)

(73) Assignee: Panasonic Corporation, Osaka (JP)

( * ) Notice: Subject to any disclaimer, the term of this patent is extended or adjusted under 35 U.S.C. 154(b) by 693 days.

(21) Appl. No.: 11/280,249

(22) Filed: Nov. 17, 2005

(65) Prior Publication Data

US 2006/0165300 A1     Jul. 27, 2006

(30) Foreign Application Priority Data

Jan. 27, 2005     (JP)     ............... 2005-020041

(51) Int. Cl.
    *G06K 9/36*     (2006.01)
(52) U.S. Cl. ............... 382/233; 382/236; 382/238
(58) Field of Classification Search ............... 382/232, 382/233, 236, 238, 239, 258, 316, 197; 326/26, 326/82; 360/77.08, 51, 78.14; 375/316, 375/341; 370/358, 359, 498; 711/154, 164, 711/168
See application file for complete search history.

(56) References Cited

U.S. PATENT DOCUMENTS

| | | | | | |
|---|---|---|---|---|---|
| 4,093,941 | A | * | 6/1978 | Bryan et al. ............... | 382/197 |
| 5,185,736 | A | * | 2/1993 | Tyrrell et al. ............... | 370/358 |
| 5,420,730 | A | * | 5/1995 | Moon et al. ............... | 360/77.08 |
| 5,586,200 | A | * | 12/1996 | Devaney et al. ............. | 382/232 |
| 6,636,565 | B1 | | 10/2003 | Kim ..................... | 375/240.27 |
| 7,176,721 | B2 | * | 2/2007 | Ho et al. ..................... | 326/82 |
| 7,266,661 | B2 | * | 9/2007 | Walmsley ................... | 711/164 |

FOREIGN PATENT DOCUMENTS

JP     09-271025     10/1997

* cited by examiner

*Primary Examiner*—Anh Hong Do
(74) *Attorney, Agent, or Firm*—McDermott Will & Emery LLP

(57) ABSTRACT

A video decoding apparatus of decoding a code bit sequence obtained by encoding a block composed of M×N (M and N are natural numbers) pieces of image data, is provided. The number of pieces of data decoded by the decoding section is counted by a count section. When the count value is M×N or less and a code indicating a block boundary is detected, the decoding section starts a decoding process of the next block after ending an M×N-th decoding process. If the code indicating the block boundary is not detected when the count value is M×(N+1) or more, the decoding section continues a decoding process. It is determined that M×N-th or earlier data among the decoded data are valid and M×(N+1)-th or later data among the decoded data are invalid, and only the valid data is output.

14 Claims, 26 Drawing Sheets

US 7,499,593 B2

VIDEO DECODING APPARATUS

CROSS REFERENCE TO RELATED APPLICATIONS

This non-provisional application claims priority under 35 U.S.C. §119(a) on patent application Ser. No. 2005-020041 filed in Japan on Jan. 27, 2005, the entire contents of which are hereby incorporated by reference.

BACKGROUND OF THE INVENTION

The present invention relates to a video decoding apparatus of decoding encoded image data, and more particularly, to a video decoding apparatus of enhancing resistance to an error occurring in a bit stream.

In conventional video decoding apparatuses, when an error is detected during a decoding process of encoded video data, returning (resynchronization) to normal decoding is performed with respect to a group of a plurality of macroblock units. An absolute position on a picture of the leading macroblock of the group can be calculated based on the leading macroblock, by detecting a start code (marker) indicating the head of a group in a bit stream (encoded data). And the decoding process of data following the head can be resumed from a correct position on the picture.

Further, when an error is detected, data is skipped until the next sequence or the next I-picture, or a hierarchical layer higher than or equal to a GOP (Group of Picture). In the case of a B-picture, data is skipped until the next picture. In place of image data within the skipped range, an immediately previous image or a black screen is displayed (see, for example, Japanese Patent Unexamined Publication No. H09-271025).

Next, a data structure of encoded data will be described. The encoded data is composed of a leading marker, a header information portion required for decoding, and one or more pieces of encoded image data each having a constant length and containing a resynchronization marker and a plurality of variable-length codes. For example, as illustrated in FIG. 1, the data structure is composed of a leading marker 21, a header information portion 22, and a plurality of pieces of variable-length encoded data 23 in sequence. Each variable-length encoded data 23 contains a resynchronization marker 24 and a plurality of pieces of encoded data 25.

Here, MPEG4 will be described as an exemplary data encoding scheme. FIG. 2 illustrates the data structure of standard image data. In the case of the MPEG4 scheme, encoded data is constructed by a three-level structure including a VOS 31 (Visual Object Sequence), a VOL 32 (Video Object Layer), and a VOP 33 (Video Object Plane). The VOP 33 contains a VOPHeader 34 as a start code at a head thereof, followed by one or more sets of an RSM 35 (Resync Marker), a VPHeader 36 (Video Packet Header), and an MB 37 (Macroblock) as encoded image data, each set has a constant length.

The VOS 31 and the VOL 32 have various parameters related to decoding. The VOP 33 contains: a parameter related to decoding of the VOP 33, the parameter following the VOPHeader 34; an RSM 35 provided every constant length; a VPHeader 36 having various parameters related to decoding of data until the next RSM 35, a VPHeader 36 following the RSM 35; and a plurality of MBs 37 following the VPHeader 36. Each MB 37 contains an MBHeader 38 and a plurality of variable-length encoded Blocks 39. The Block 39 is variable-length encoded image data.

Next, as an exemplary decoding scheme, a Block decoding scheme called "Inter" will be described. FIG. 3 illustrates an exemplary data structure of a Block. It is assumed that image data is processed on a Block-by-Block basis. A Block contains one encoded DC value and 63 encoded AC values.

FIG. 4 is a flowchart illustrating a process of decoding a Block. As illustrated in FIG. 4, in step S401, one code is decoded. By the decoding process, the number of pieces of zero data (RUN), nonzero data (LEVEL) following the RUN, and a code (LAST) indicating that there is no nonzero data after the LEVEL, are obtained.

Next, in step S402, it is determined whether or not the value of the RUN is "0". When the result of the determination in step S402 is "NO", the process goes to step S403. In step S403, zero data is output. Thereafter, the process goes to step S404, in which the current value of the RUN is reduced by 1, and returns to step S402. By repeatedly performing such a procedure, zero data is eventually output a number of times corresponding to the value of the RUN.

When the result of the determination in step S402 is "YES", the process goes to step S405. In step S405, the LEVEL (nonzero data) is output.

Next, in step S406, it is determined whether or not the value of the LAST is "1". Here, it is defined in the specification that, in one Block, the sum of the number of pieces of zero data and the number of pieces of nonzero data is invariably 64. Therefore, when 64-th data is nonzero data, or when there is no nonzero data among data from nonzero data to 64-th data, the value of the LAST is assumed to be "1".

When the result of the determination in step S406 is "NO" (the value of the LAST is "0"), the process goes to step S401, in which the next code is decoded. When the result of the determination in step S406 is "YES", the process goes to step S407.

In step S407, it is determined whether or not the number of pieces of output data is 64. When the result of the determination in step S407 is "NO", the process goes to step S408. In step S408, zero data is output, and thereafter, the process returns to step S407. By repeatedly performing such a procedure, zero data is eventually output a number of times corresponding to the value of the RUN.

When the result of the determination in step S407 is "YES", the Block decoding process is ended.

SUMMARY OF THE INVENTION

However, in conventional video decoding apparatuses, when such an error is detected in encoded data, there is, for example, a problem that a macroblock which does not contain an error is discarded in order to set the position of the leading macroblock of a newly detected group to be a resynchronization point.

In detail, in the decoding scheme called "Inter," for example, if the value of the LAST is not "1" when the number of pieces of decoded data exceeds a specified number (64), there is a problem that the decoding process cannot be continued.

In consideration of these problems, the present invention is achieved. An object of the present invention is to perform an appropriate error correction, depending on the cause of occurrence of error, to minimize a degradation in image quality due to the error.

The present invention provides a video decoding apparatus of receiving and decoding a bit sequence obtained by encoding a block composed of M×N (M and N are natural numbers) pieces of image data, comprising:

a decoding section of decoding the encoded image data to output decoded data, and when detecting a code indicating a block boundary present in the bit sequence, outputting a boundary detection signal;

a count section of counting the number of pieces of data decoded by the decoding section;

a validity determining section of determining whether the decoded data is valid or invalid, based on a count value of the count section and the boundary detection signal; and an output data generating section of selecting and outputting only valid data among the decoded data, based on a result of the determination by the validity determining section, wherein, when the count value is M×N or less and the code indicating the block boundary is detected, the decoding section starts a decoding process of the next block after ending an M×N-th decoding process of the bit sequence, if the code indicating the block boundary is not detected when the count value is M×(N+1) or more, the decoding section continues a decoding process until the code indicating the block boundary is detected, and the validity determining section determines that M×N-th or earlier data among the decoded data are valid and M×(N+1)-th or later data among the decoded data are invalid.

The present invention also provides a video decoding apparatus of receiving and decoding a bit sequence obtained by encoding a block composed of M×N (M and N are natural numbers) pieces of image data, comprising:

a decoding section of decoding the encoded image data to output decoded data, and when detecting a code indicating a block boundary present in the bit sequence, outputting a boundary detection signal;

a count section of counting the number of pieces of data decoded by the decoding section;

a decoded data holding section of successively holding M×N pieces of decoded data output by the decoding section using the count value of the count section as an address, wherein, when the count value is M×N or less and the code indicating the block boundary is detected, the decoding section starts a decoding process of the next block after ending an M×N-th decoding process of the bit sequence, if the code indicating the block boundary is not detected when the count value is M×(N+1) or more, the decoding section continues a decoding process until the code indicating the block boundary is detected, and the decoded data holding section does not hold the M×(N+1)-th or later decoded data, and when the code indicating the block boundary is not detected, outputs the currently held decoded data.

As described above, according to the present invention, even when encoded data contains more than 64 pieces of data and violates the specification, decoding can be continued without losing synchronization with the encoded data. Therefore, it is no longer necessary to skip images until the next RSM or start code in order to achieve synchronization. As a result, it is possible to suppress visual disturbance in an image.

DETAILED DESCRIPTION OF THE PREFFERED EMBODYMENT

Hereinafter, embodiments of the present invention will be described with reference to the accompanying drawings. The following embodiments are provided only for illustrative purposes, and are not intended to limit the applications or methods of use of the present invention.

Embodiment 1

Figure 1:
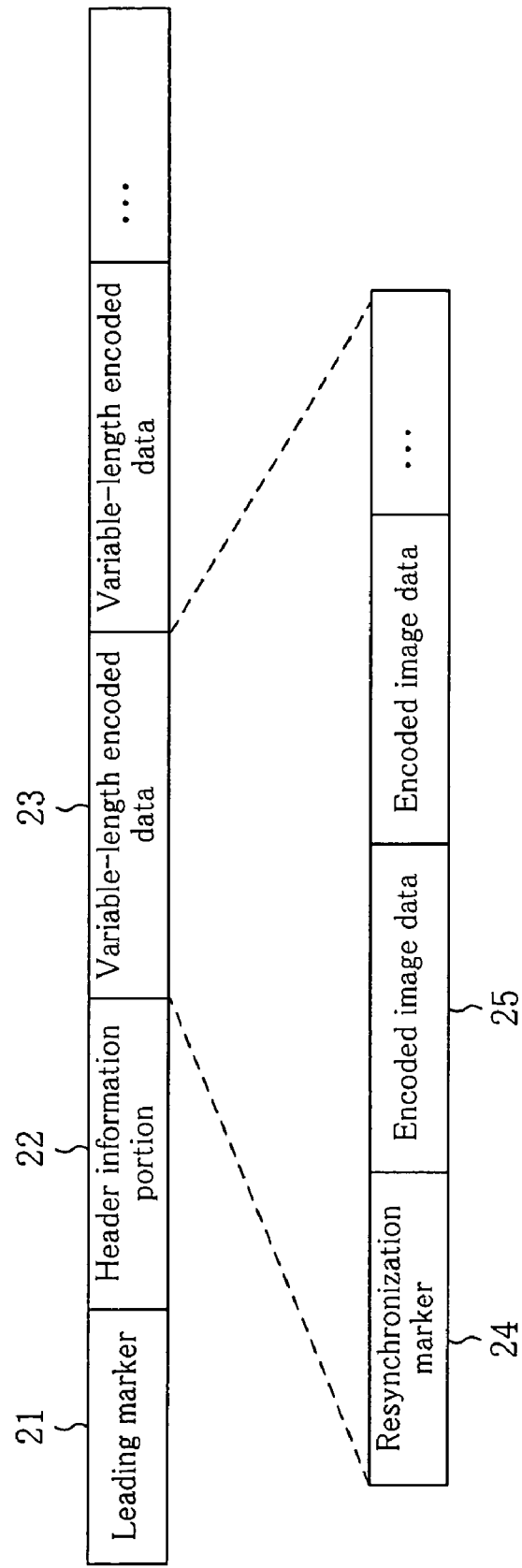
FIG. 1 is a diagram illustrating a structure of representative encoded data.
Figure 2:
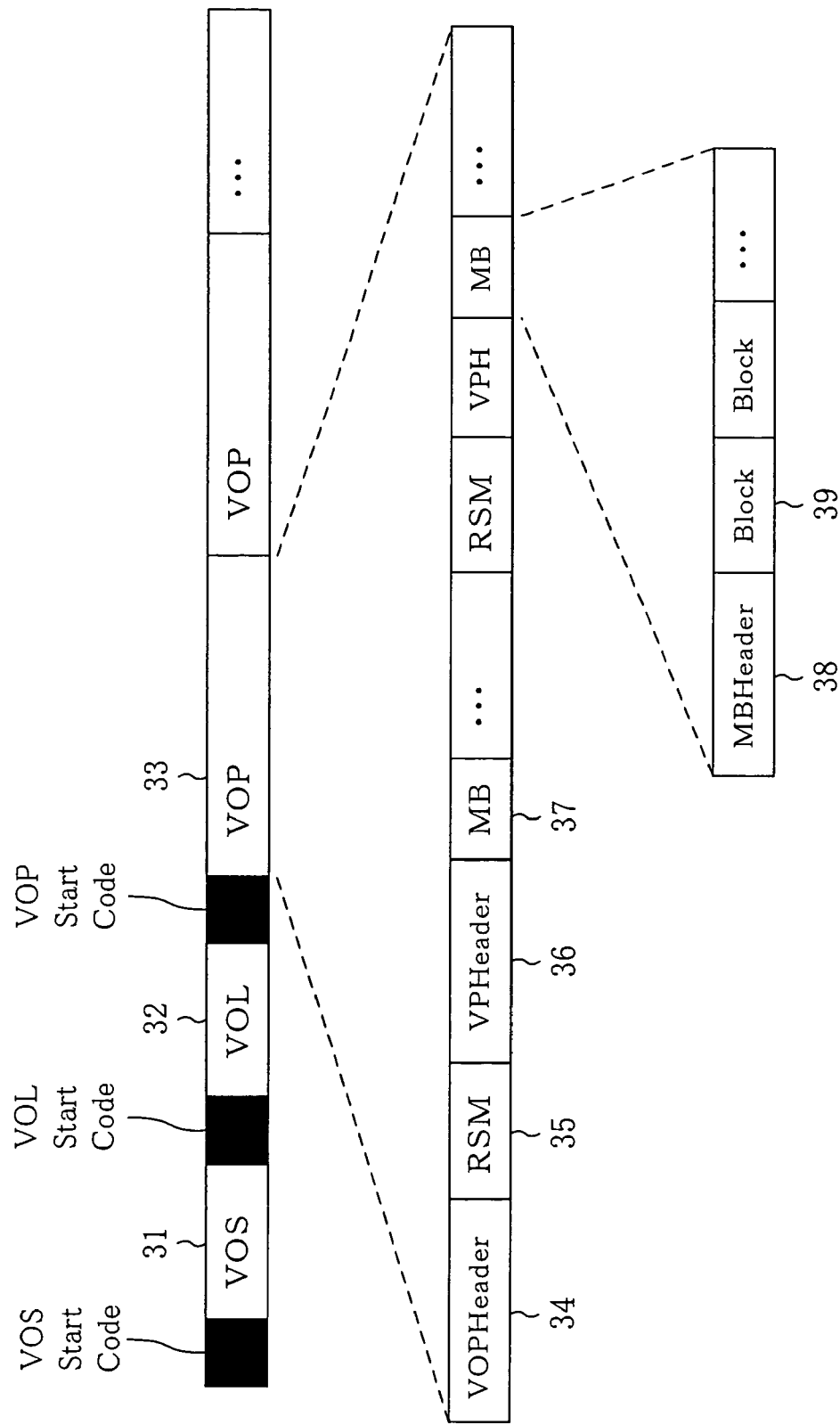
FIG. 2 illustrates an encoded data structure of a standard image data of MPEG4.
Figure 3:
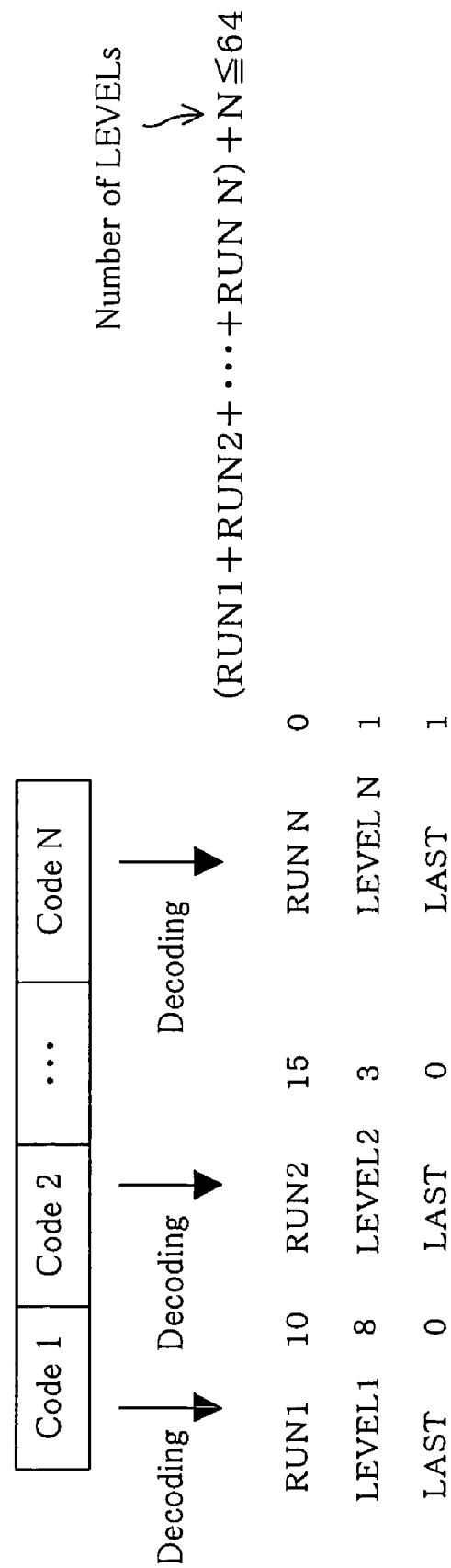
FIG. 3 is a diagram illustrating a structure of encoded data of a Block.
Figure 4:
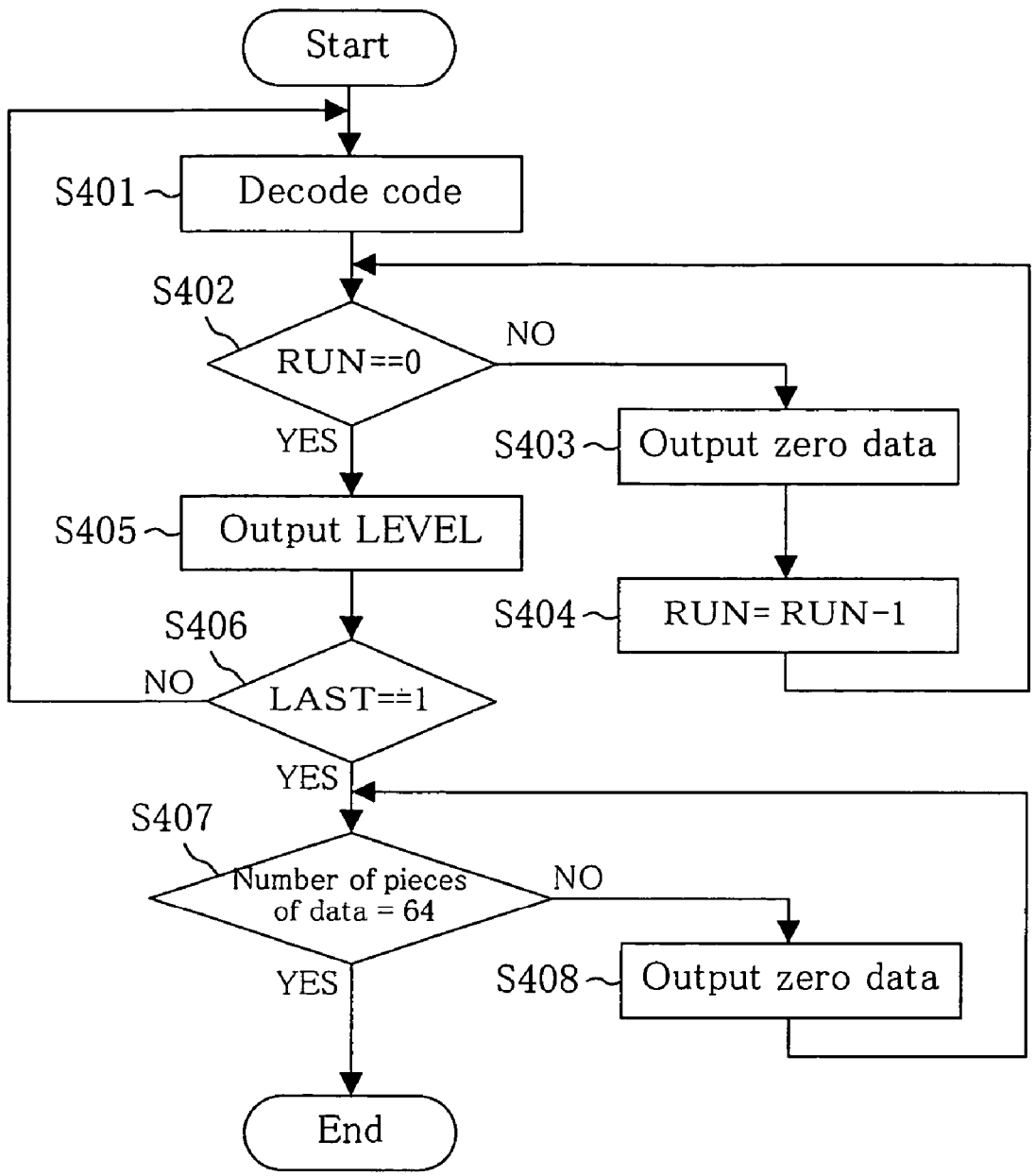
FIG. 4 is a flowchart illustrating a process of decoding a Block.
Figure 5:
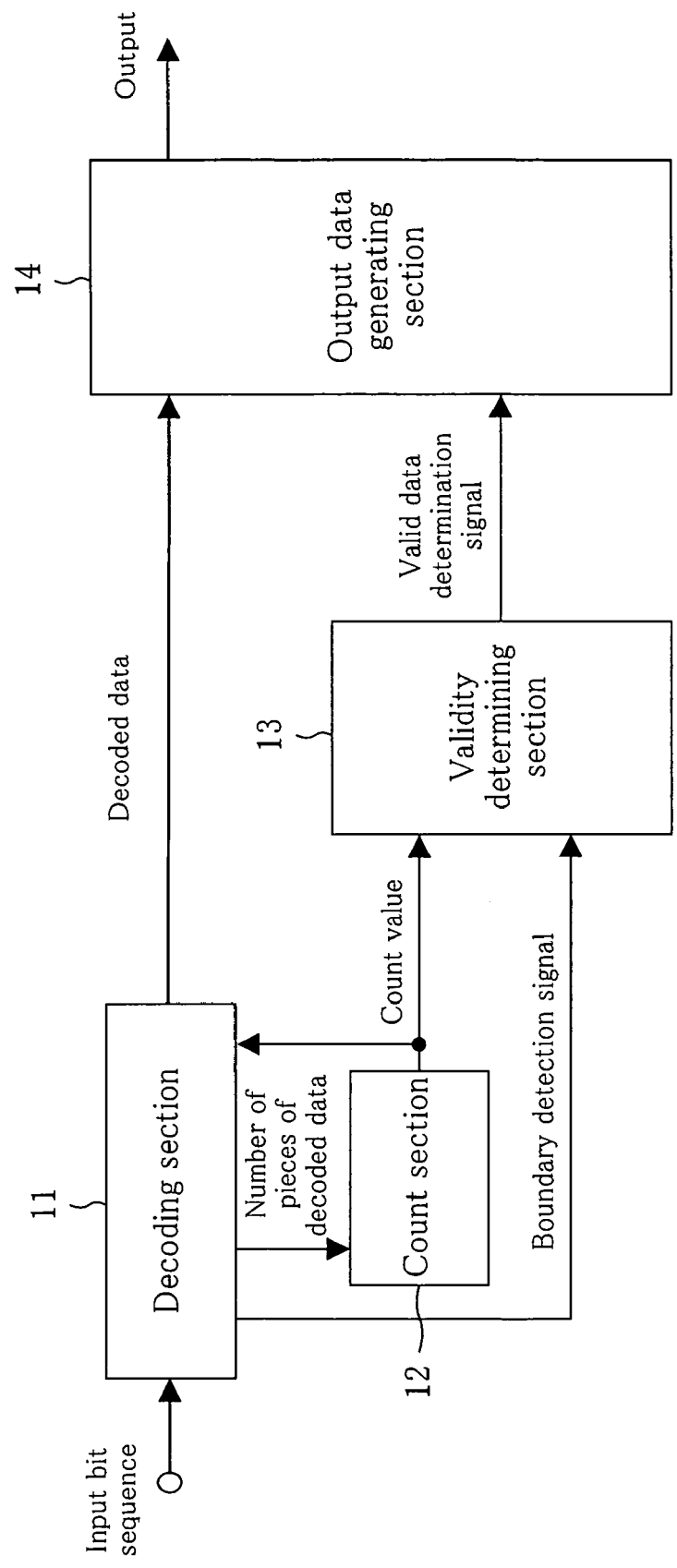
FIG. 5 is a block diagram illustrating a whole structure of a video decoding apparatus according to Embodiment 1 of the present invention.

FIG. 5 is a block diagram illustrating a whole structure of a video decoding apparatus according to Embodiment 1 of the present invention. As illustrated in FIG. 5, 11 indicates a decoding section of decoding a code bit sequence input to the video decoding apparatus. Decoded data is input to an output data generating section 14. The decoding section 11 outputs information about the number of pieces of decoded data obtained by decoding a code bit sequence, to a count section 12. The decoding section 11 also outputs a boundary detection signal to a validity determining section 13 when a code indicating a boundary of an MB of encoded data is detected.

As used herein, the code indicating a boundary of an MB refers to a code indicating that the value of a LAST indicating that there is no nonzero data in the following data in the MB is "1". The decoding process of the decoding section 11 is continued until such a code indicating a boundary is detected. After the boundary is detected, when a count value input from the count section 12 is less than 64, zero data is output to the output data generating section 14 until the count value reaches 64. When the count value input from the count section 12 is 64 or more, the decoding process is ended.

The count section 12 counts the number of pieces of decoded data, and outputs the count value to the decoding section 11 and the validity determining section 13. The validity determining section 13 generates a valid data determination signal indicating the validity of decoded data based on the count value and the boundary detection signal, and outputs the valid data determination signal to the output data generating section 14.

Specifically, in the case of the MPEG4 scheme, since the number of pieces of data in one MB is 64, when the count value output by the count section 12 is 64 or less, it is determined that the decoded data is valid, and "1" is output as a valid data determination signal. On the other hand, when the count value is more than 64, it is determined that 65-th data or later is invalid, and "0" is output as a valid data determination signal, until the boundary detection signal is input from the decoding section 11.

The output data generating section 14 selectively outputs the decoded data input from the decoding section 11 based on the valid data determination signal. Specifically, when the result of the validity determination is "valid", the output data generating section 14 outputs the decoded data, and when the result of the validity determination is "invalid", the output data generating section 14 does not output the decoded data.

Figure 6:
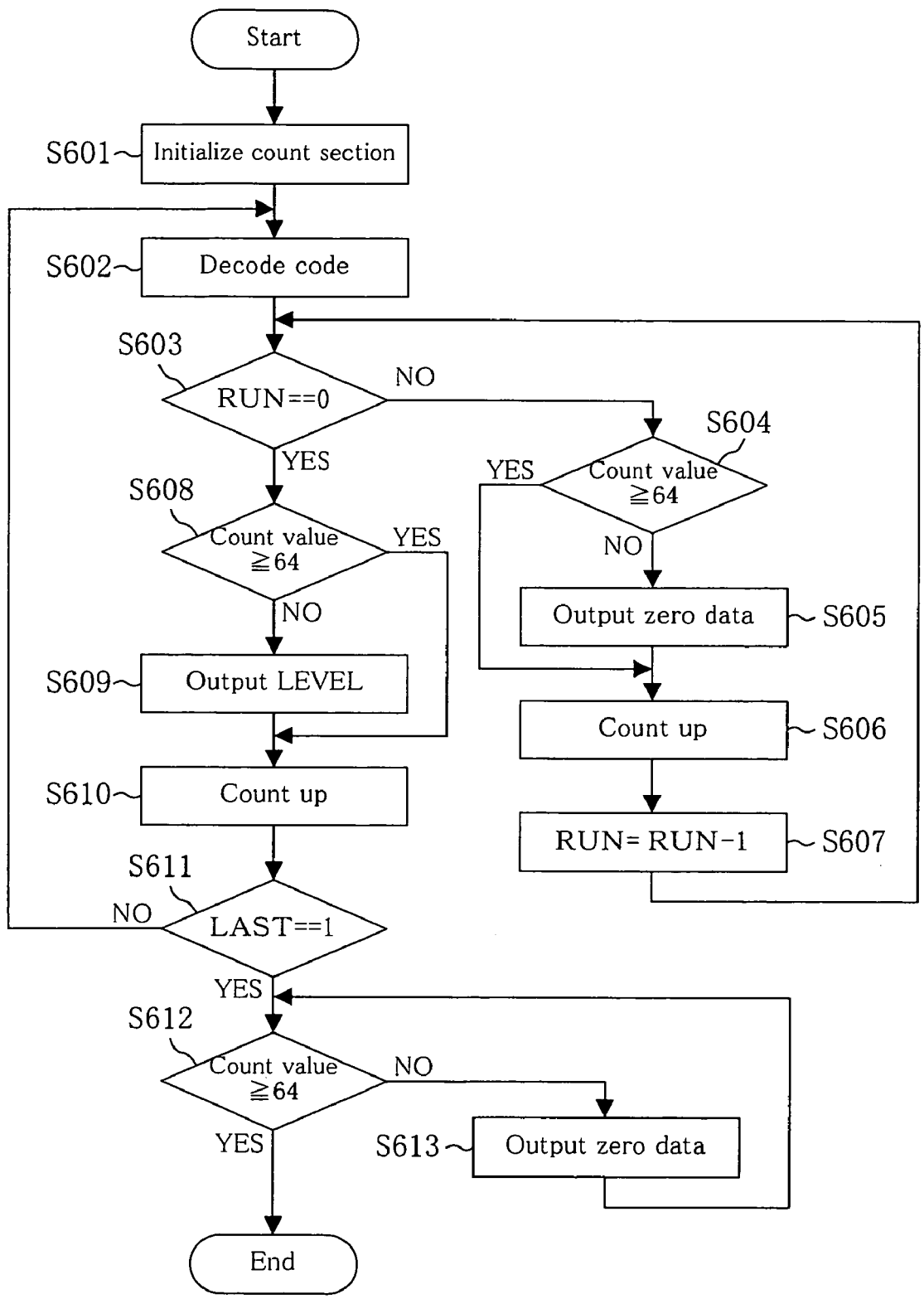
FIG. 6 is a flowchart illustrating a decoding process of the video decoding apparatus of Embodiment 1 of the present invention.

FIG. 6 is a flowchart illustrating a decoding process of the video decoding apparatus of Embodiment 1 of the present invention. As illustrated in FIG. 6, in step S601, the count value of the count section 12 is initialized. Next, in step S602, the first code of a Block is decoded. Thereby, the values of a RUN, a LEVEL, and a LAST are obtained.

Next, in step S603, it is determined whether or not the value of the RUN is "0". When the result of the determination in step S603 is "NO", the process goes to step S604. In step S604, it is determined whether or not the count value of the count section 12 is 64 or more.

When the result of the determination in step S604 is "NO", the process goes to step S605, in which zero data is output to the output data generating section 14. Thereafter, the process goes to step S606. When the result of the determination in step S604 is "YES", the process goes to step S606 without outputting data.

In step S606, the count value of the count section 12 is counted up. Next, in step S607, the current value of the RUN is reduced by 1. Thereafter, the process returns to step S603. By repeatedly performing such a procedure, the result of the determination in step S603 eventually becomes "YES", and the count value of the count section 12 is counted up by the value of the RUN, and thereafter, the process goes to step S608.

In step S608, it is determined whether or not the count value of the count section 12 is 64 or more. When the result of the determination in step S608 is "NO", the process goes to step S609. In step S609, the LEVEL (nonzero data) is output to the output data generating section 14, and thereafter, the process goes to step S610. When the result of the determination in step S608 is "YES", a signal indicating that the data is invalid is output from the validity determining section 13 to the output data generating section 14, and thereafter, the process goes to step S610 without outputting data. In step S610, the count value of the count section 12 is counted up.

Next, in step S611, it is determined whether or not the value of the LAST is "1". When the result of the determination in step S611 is "NO" (the value of the LAST is "0"), the process goes to step S602, in which the next code is decoded. When the result of the determination in step S611 is "YES", the process goes to step S612.

In step S612, it is determined whether or not the count value of the count section 12 is 64 or more. When the result of the determination in step S612 is "NO", the process goes to step S613. In step S613, zero data is output to the output data generating section 14, and thereafter, the process returns to step S612. When the result of the determination in step S612 is "YES", the decoding of the Block is ended. By repeatedly performing such a procedure, zero data is output to the output data generating section 14 until the count value eventually reaches 64, and thereafter, the decoding is ended.

In other words, even if encoded data the value of the LAST of which is not "1" when the number of pieces of decoded data exceeds 64 (i.e., the encoded data violates the specification) is input, the decoding process can be continued in the decoding section 11, so that the counting-up is also continued in the count section 12. Thereafter, the validity determining section 13 outputs a signal indicating the invalidity to the output data generating section 14, and therefore, 64-th data or later is not eventually output from the output data generating section 14. Thereafter, when the value of the LAST reaches "1", the decoding of the Block is ended.

As described above, according to the video decoding apparatus of Embodiment 1 of the present invention, even when encoded data contains more than 64 pieces of data and violates the specification, decoding can be continued without losing synchronization with the encoded data. Therefore, it is no longer necessary to skip images until the next RSM or start code in order to achieve synchronization.

Embodiment 2

Figure 7:
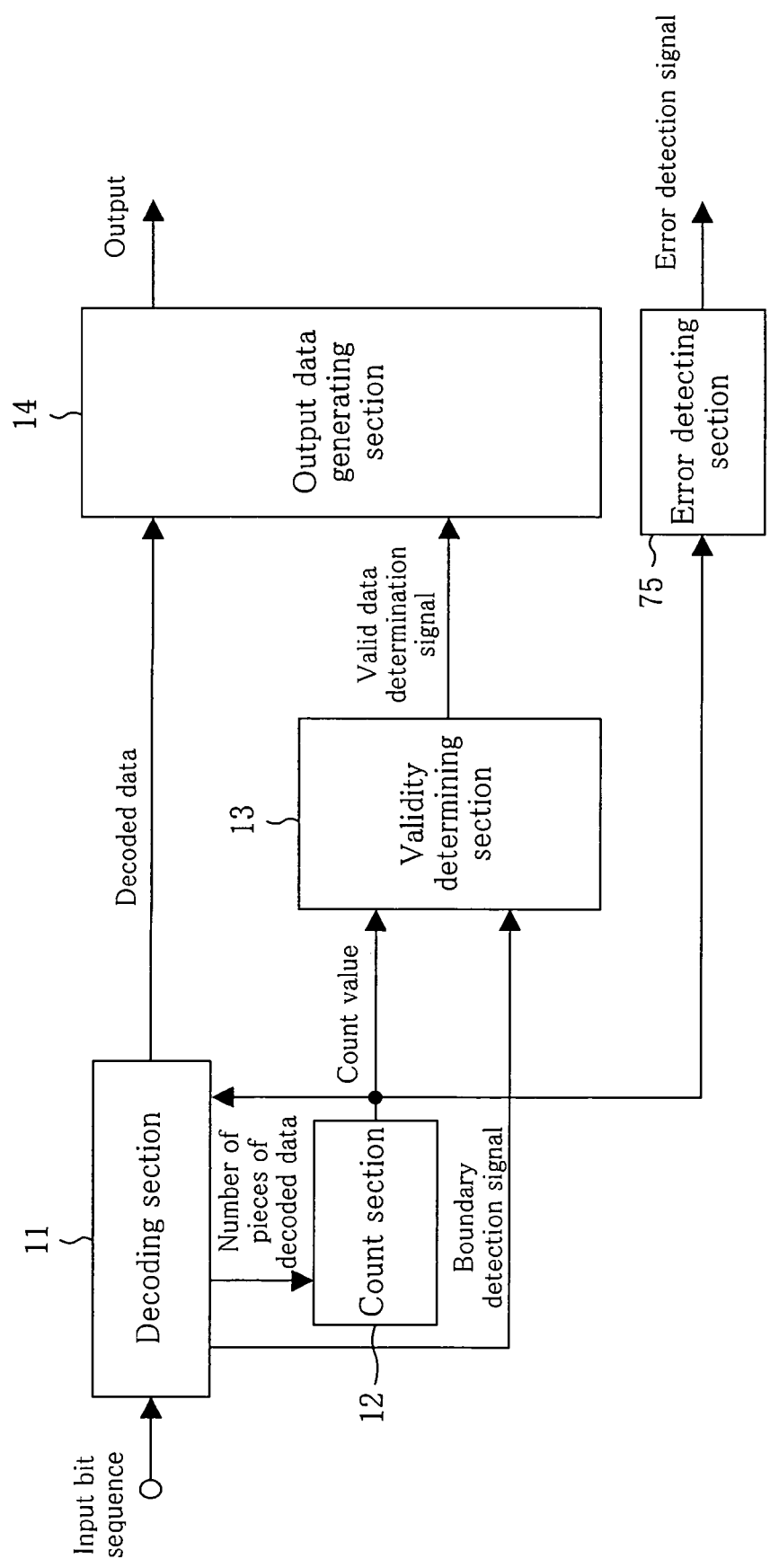
FIG. 7 is a block diagram illustrating a whole structure of a video decoding apparatus according to Embodiment 2 of the present invention.

FIG. 7 is a block diagram illustrating a whole structure of a video decoding apparatus according to Embodiment 2 of the present invention, which is different from that of Embodiment 1 only in that an error detecting section is provided. Therefore, the same parts as those of Embodiment 1 are hereinafter indicated by the same reference numerals, and only the difference will be described (the same is true of Embodiments 3 to 8).

Figure 8:
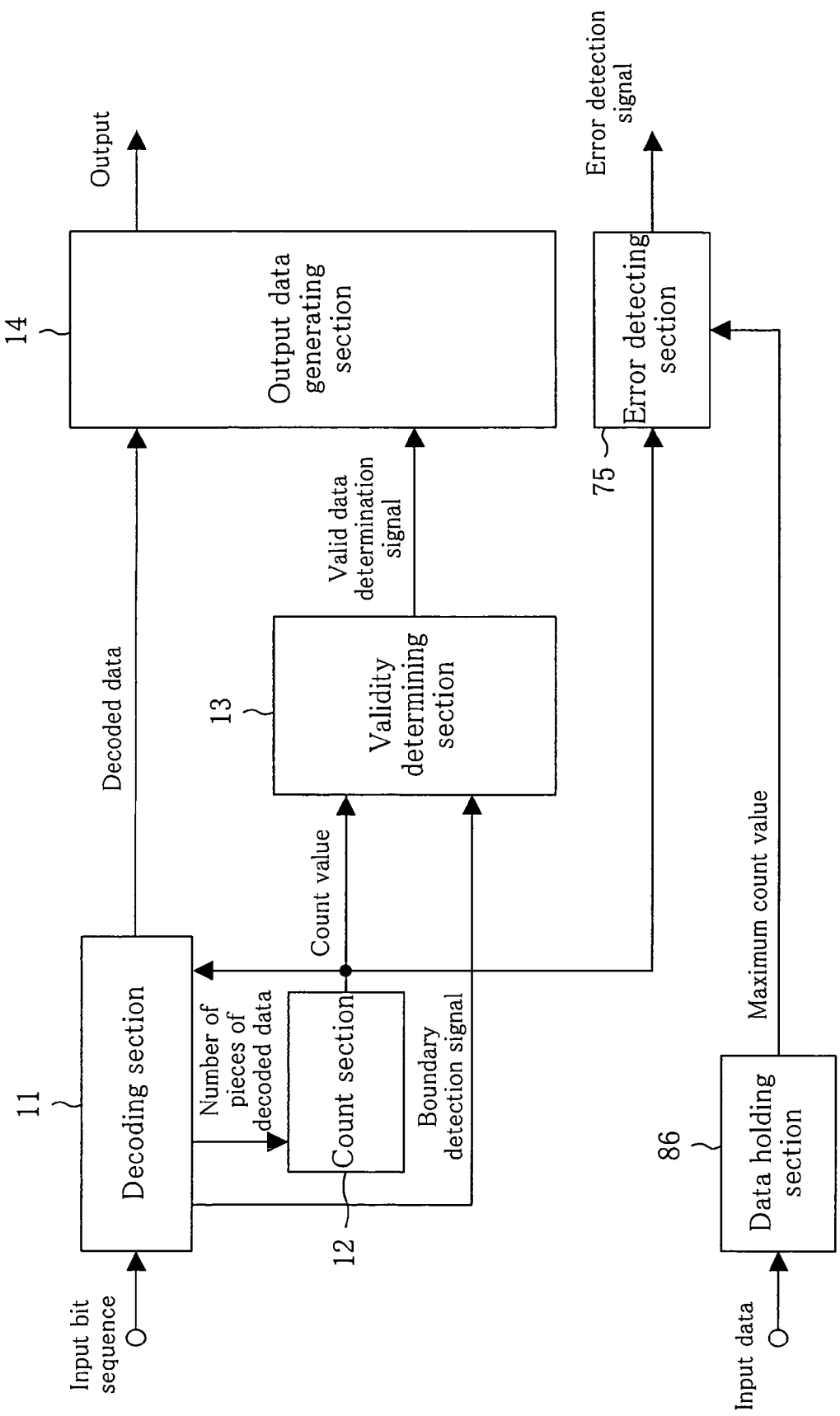
FIG. 8 is a block diagram illustrating another whole structure of a video decoding apparatus according to Embodiment 2 of the present invention.

The error detecting section 75 is connected to the count section 12, and informs an error when a count value received from the count section 12 exceeds a tolerable maximum value. Note that, as illustrated in FIG. 8, if a data holding section 86 is connected to the error detecting section 75, and the maximum count value is set by the data holding section 86, it is more preferable that the maximum count value can be set to be an arbitrary value. Hereinafter, a decoding process using the video decoding apparatus of FIG. 8 will be described.

Figure 9:
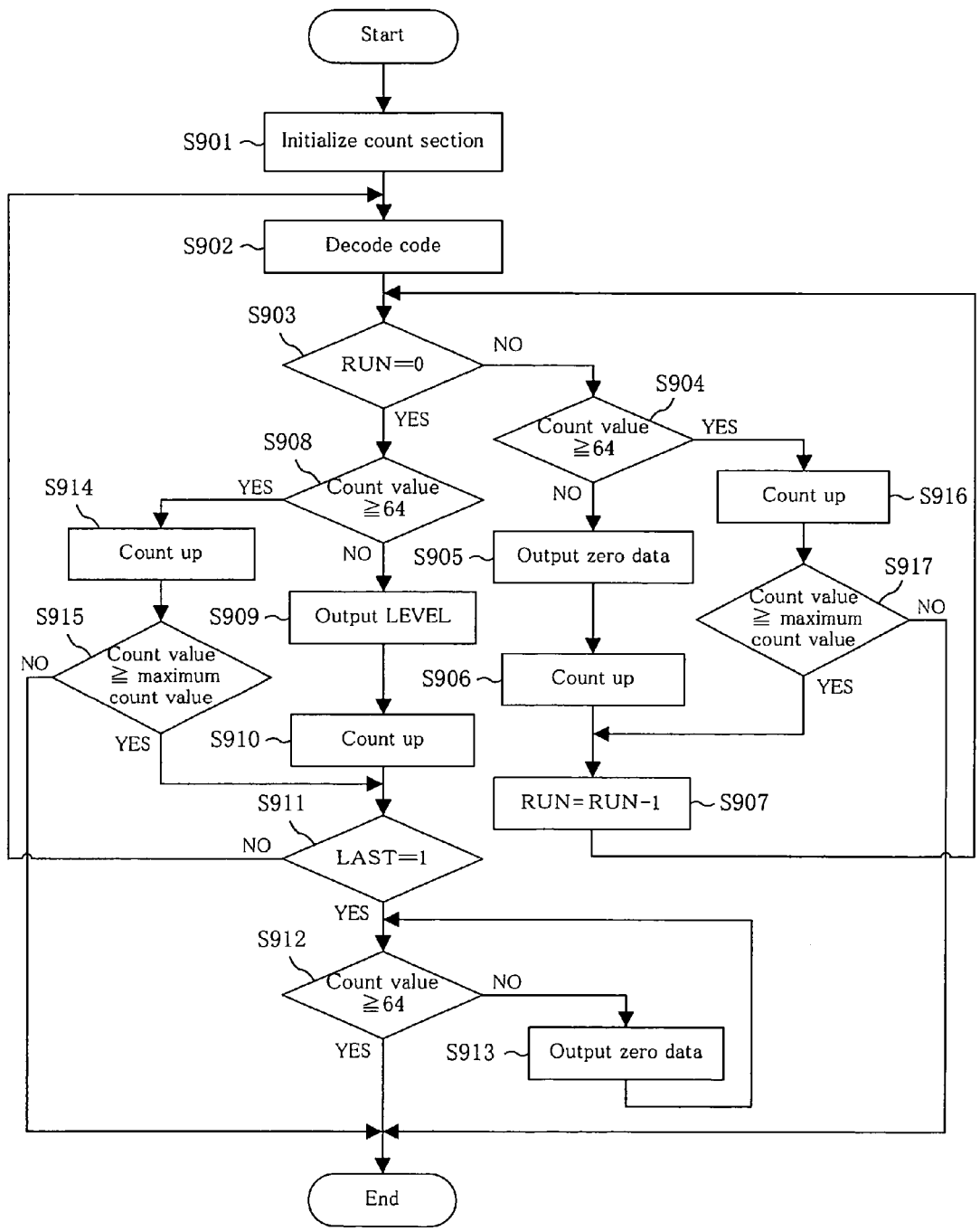
FIG. 9 is a flowchart illustrating a decoding process of Embodiment 2 of the present invention.

FIG. 9 is a flowchart illustrating a decoding process in the video decoding apparatus of Embodiment 2 of the present invention. As illustrated in FIG. 9, in step S901, the count value of the count section 12 is initialized. Next, in step S902, the first code of a Block is decoded. Thereby, the values of a RUN, a LEVEL, and a LAST are obtained.

Next, in step S903, it is determined whether or not the value of the RLN is "0". When the result of the determination in step S903 is "NO", the process goes to step S904. In step S904, it is determined whether or not the count value of the count section 12 is 64 or more.

When the result of the determination in step S904 is "NO", the process goes to step S905, in which zero data is output to the output data generating section 14. Thereafter, the process goes to step S906. In step S906, the count value of the count section 12 is counted up, and thereafter, the process goes to step S907.

When the result of the determination in step S904 is "YES", the process goes to step S916. In step S916, the count value of the count section 12 is counted up, and thereafter, the process goes to step S917. In step S917, in the error detecting section 75, the maximum count value previously held in the data holding section 86 is compared with the count value to determine whether or not the count value is greater than the maximum count value.

When the result of the determination in step S917 is "YES", the process goes to step S907, in which the decoding process is continued. When the result of the determination in step S917 is "NO", it is determined that an error occurs, an error detection signal is output from the error detecting section 75, and the decoding process is ended.

In step S907, the current value of the RUN is reduced by 1. Thereafter, the process returns to step S903. By repeatedly performing such a procedure, the result of the determination in step S903 eventually becomes "YES", and the count value of the count section 12 is counted up by the value of the RUN, and thereafter, the process goes to step S908.

In step S908, it is determined whether or not the count value of the count section 12 is 64 or more. When the result of the determination in step S908 is "NO", the process goes to step S909. In step S909, the LEVEL (nonzero data) is output to the output data generating section 14, and thereafter, the process goes to step S910. In step S910, the count value of the count section 12 is counted up, and thereafter, the process goes to step S911.

When the result of the determination in step S908 is "YES", the process goes to step S914. In step S914, the count value of the count section 12 is counted up, and thereafter, the process goes to step S915. In step S915, in the error detecting section 75, the maximum count value previously held in the data holding section 86 is compared with the count value to determine whether or not the count value is greater than the maximum count value.

When the result of the determination in step S915 is "YES", the process goes to step S911, in which the decoding process is continued. When the result of the determination in step S915 is "NO", it is determined that an error occurs, an error detection signal is output from the error detecting section 75, and the decoding process is ended.

Next, in step S911, it is determined whether or not the value of the LAST is "1". When the result of the determination in step S911 is "NO" (the value of the LAST is "0"), the process goes to step S902, in which the next code is decoded. When the result of the determination in step S911 is "YES", the process goes to step S912.

In step S912, it is determined whether or not the count value of the count section 12 is 64 or more. When the result of the determination in step S912 is "NO", the process goes to step S913. In step S913, zero data is output to the output data generating section 14, and thereafter, the process returns to step S912. When the result of the determination in step S912 is "YES", the decoding of the Block is ended. By repeatedly performing such a procedure, zero data is output to the output data generating section 14 until the count value eventually reaches 64, and thereafter, the decoding is ended.

In other words, even if encoded data the value of the LAST of which is not "1" when the number of pieces of data exceeds 64 (i.e., the encoded data violates the specification) is input, the decoding process can be continued in the decoding section 11.

Thereafter, the validity determining section 13 outputs a signal indicating the invalidity to the output data generating section 14, and therefore, 64-th data or later is not eventually output from the output data generating section 14. Thereafter, when the value of the LAST reaches "1", the decoding of the Block is ended. Here, if a maximum count value is previously provided in the data holding section 86, an error can be informed with an arbitrary number of pieces of encoded data so that the decoding process can be ended. In this case, concerning synchronization with encoded data, the next RSM or VOP start code is searched for and resynchronization is performed, and in place of an image skipped during that procedure, an immediately previous image displayed at the same position is displayed.

As described above, according to the video decoding apparatus of Embodiment 2 of the present invention, even when encoded data contains more than 64 pieces of data and violates the specification, decoding can be continued without losing synchronization with the encoded data. In addition, even if a code indicating a boundary is not detected and the processing of one block is not ended when encoded data the amount of which is larger than or equal to an arbitrary data amount is decoded, the error can be informed so that the decoding can be ended, and it is possible to freely set whether or not to skip an image until the next RSM or start code in order to achieve synchronization of the encoded data.

Embodiment 3

Figure 10:
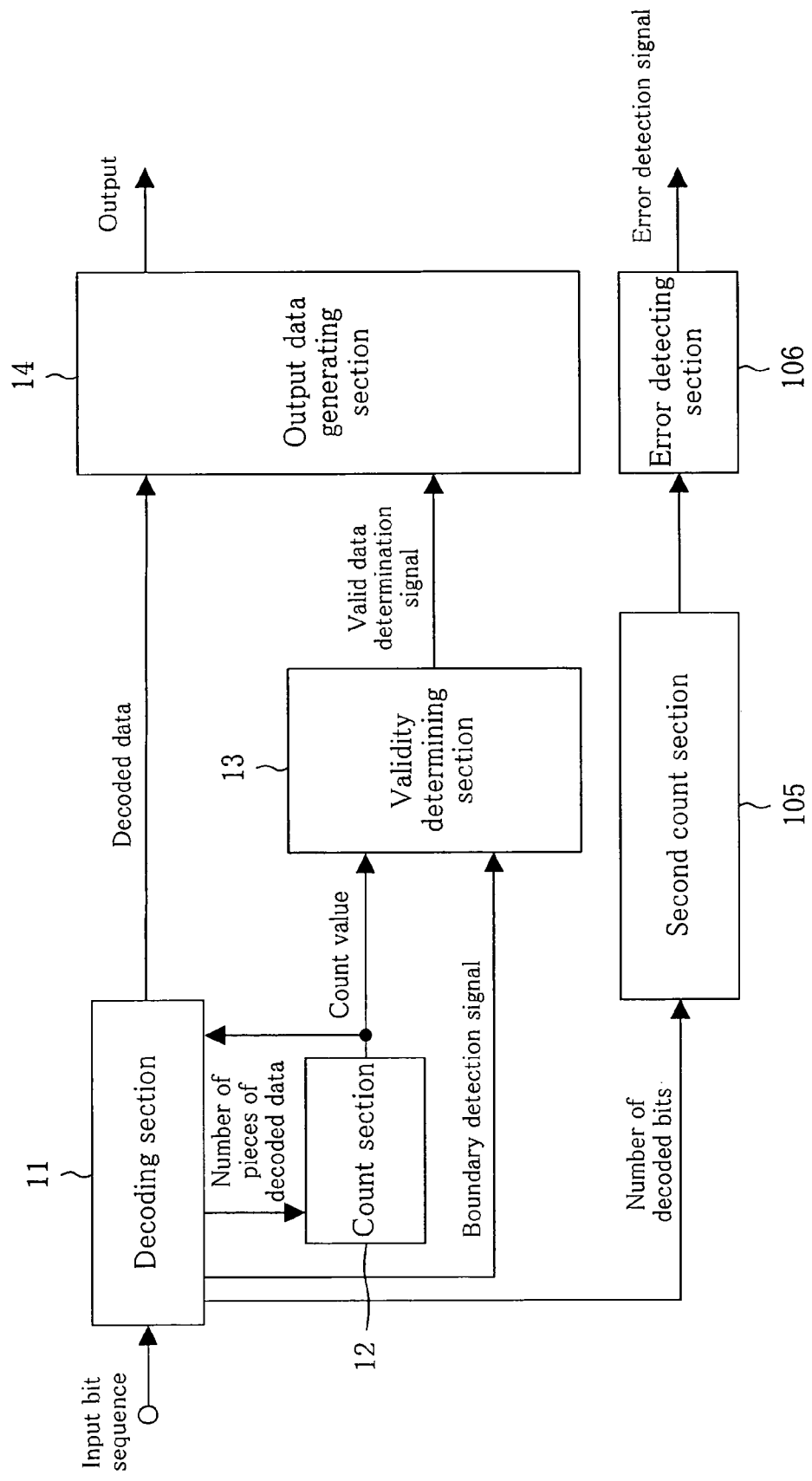
FIG. 10 is a block diagram illustrating a whole structure of a video decoding apparatus according to Embodiment 3 of the present invention.

FIG. 10 is a block diagram illustrating a whole structure of a video decoding apparatus according to Embodiment 3 of the present invention, which is different from that of Embodiment 2 only in that a second count section of counting the number of bits of encoded data is provided. Therefore, the same parts as those of Embodiment 2 are hereinafter indicated by the same reference numerals, and only the difference will be described.

The second count section 105 is connected to the decoding section 11, and counts the number of bits in encoded data which are consumed when the encoded data is decoded in the decoding section 11. Thereafter, a count value output from the second count section 105 is input to an error detecting section 106.

Figure 11:
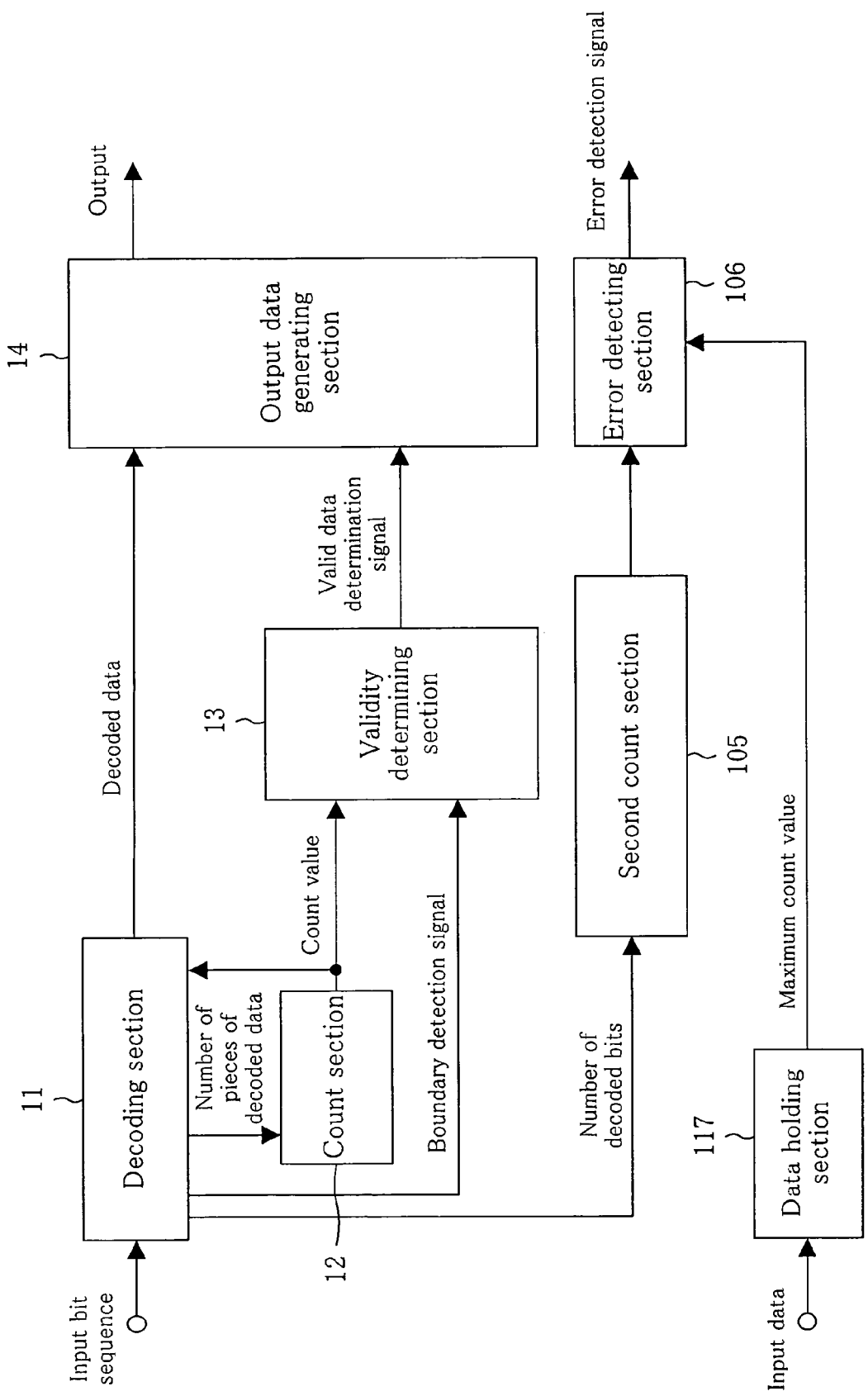
FIG. 11 is a block diagram illustrating another whole structure of a video decoding apparatus according to Embodiment 3 of the present invention.

The error detecting section 106 informs an error when the count value received from the second count section 105 exceeds a tolerable maximum value. Note that, as illustrated in FIG. 11, if a data holding section 117 is connected to the error detecting section 106, and the maximum count value is set by the data holding section 117, it is more preferable that the maximum count value can be set to be an arbitrary value. Hereinafter, a decoding process using the video decoding apparatus of FIG. 11 will be described.

Figure 12:
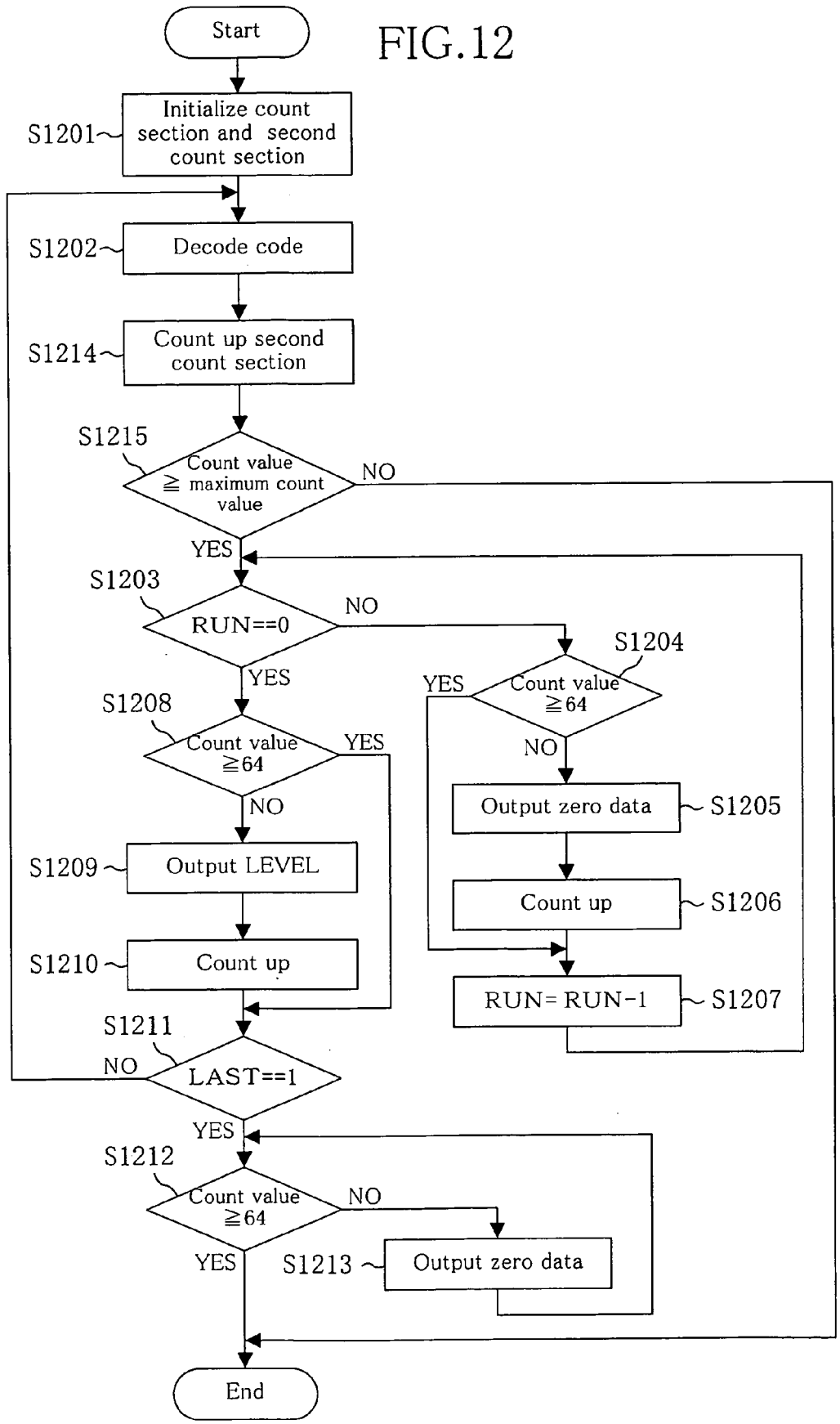
FIG. 12 is a flowchart illustrating a decoding process of Embodiment 3 of the present invention.

FIG. 12 is a flowchart illustrating a decoding process in the video decoding apparatus of Embodiment 3 of the present invention. As illustrated in FIG. 12, in step S1201, the count values of the count section 12 and the second count section 105 are initialized. Next, in step S1202, the first code of a Block is decoded. Thereby, the values of a RUN, a LEVEL, and a LAST are obtained.

Next, in step S1214, the second count section 105 is counted up by the number of bits in the decoded encoded data. Thereafter, in step S1215, in the error detecting section 106, the maximum count value previously held in the data holding section 117 is compared with the count value to determine whether or not the count value is greater than the maximum count value.

When the result of the determination in step S1215 is "YES", the process goes to step S1203, in which the decoding process is continued. When the result of the determination in step S1215 is "NO", it is determined that an error occurs, an error detection signal is output from the error detecting section 106, and the decoding process is ended.

Next, in step S1203, it is determined whether or not the value of the RUN is "0". When the result of the determination in step S1203 is "NO", the process goes to step S1204. In step S1204, it is determined whether or not the count value of the count section 12 is 64 or more.

When the result of the determination in step S1204 is "NO", the process goes to step S1205, in which zero data is output to the output data generating section 14. Thereafter, the process goes to step S1206. In step S1206, the count value of the count section 12 is counted up, and thereafter, the process goes to step S1207. When the result of the determination in step S1204 is "YES", the process goes to step S1207 without outputting data.

Next, in step S1207, the current value of the RUN is reduced by 1. Thereafter, the process returns to step 1203. By repeatedly performing such a procedure, the result of the determination in step S1203 eventually becomes "YES", and the count value of the count section 12 is counted up by the value of the RUN, and thereafter, the process goes to step S1208.

In step S1208, it is determined whether or not the count value of the count section 12 is 64 or more. When the result of the determination in step S1208 is "NO", the process goes to step S1209. In step S1209, the LEVEL (nonzero data) is output to the output data generating section 14, and thereafter, the process goes to step S1210. In step S1210, the count value of the count section 12 is counted up. Thereafter, the process goes to step S1211.

When the result of the determination in step S1208 is "YES", the process goes to step S1211. In step S1211, it is determined whether or not the value of the LAST is "1". When the result of the determination in step S1211 is "NO" (the value of the LAST is "0"), the process goes to step S1202, in which the next code is decoded. When the result of the determination in step S1211 is "YES", the process goes to step S1212.

In step S1212, it is determined whether or not the count value of the count section 12 is 64 or more. When the result of the determination in step S1212 is "NO", the process goes to step S1213. In step S1213, zero data is output to the output data generating section 14, and thereafter, the process returns to step S1212. When the result of the determination in step S1212 is "YES", the decoding of the Block is ended. By repeatedly performing such a procedure, zero data is output to the output data generating section 14 until the count value eventually reaches 64, and thereafter, the decoding is ended.

In other words, even if encoded data the value of the LAST of which is not "1" when the number of pieces of data exceeds 64 (i.e., the encoded data violates the specification) is input, the decoding process can be continued in the decoding section 11.

Thereafter, the validity determining section 13 outputs a signal indicating the invalidity to the output data generating section 14, and therefore, 64-th data or later is not eventually output from the output data generating section 14. When the value of the LAST reaches "1", the decoding of the Block is ended. Here, if a maximum count value is previously provided in the data holding section 117, an error can be informed with an arbitrary number of bits so that the decoding process can be ended. For example, in MPEG4, since an RSM is provided every a constant length of bits, and therefore, the decoding of one Block cannot be continued for bits the number of which is larger than or equal to the RSM interval. Therefore, it is effective that the maximum count value is set to be the RSM interval. In this case, concerning synchronization with encoded data, the next RSM or VOP start code is searched for and resynchronization is performed, and in place of an image skipped during that procedure, an immediately previous image displayed at the same position is displayed.

As described above, according to the video decoding apparatus of Embodiment 3 of the present invention, even when encoded data contains more than 64 pieces of data and violates the specification, decoding can be continued without losing synchronization with the encoded data. In addition, even if a code indicating a boundary is not detected and the processing of one block is not ended when encoded data the amount of which is larger than or equal to an arbitrary data amount is decoded, the error can be informed so that the decoding can be ended, and it is possible to freely set whether or not to skip an image until the next RSM or VOP start code in order to achieve synchronization of the encoded data. In addition, an optimal maximum value can be set using the code bit structure.

Embodiment 4

Figure 13:
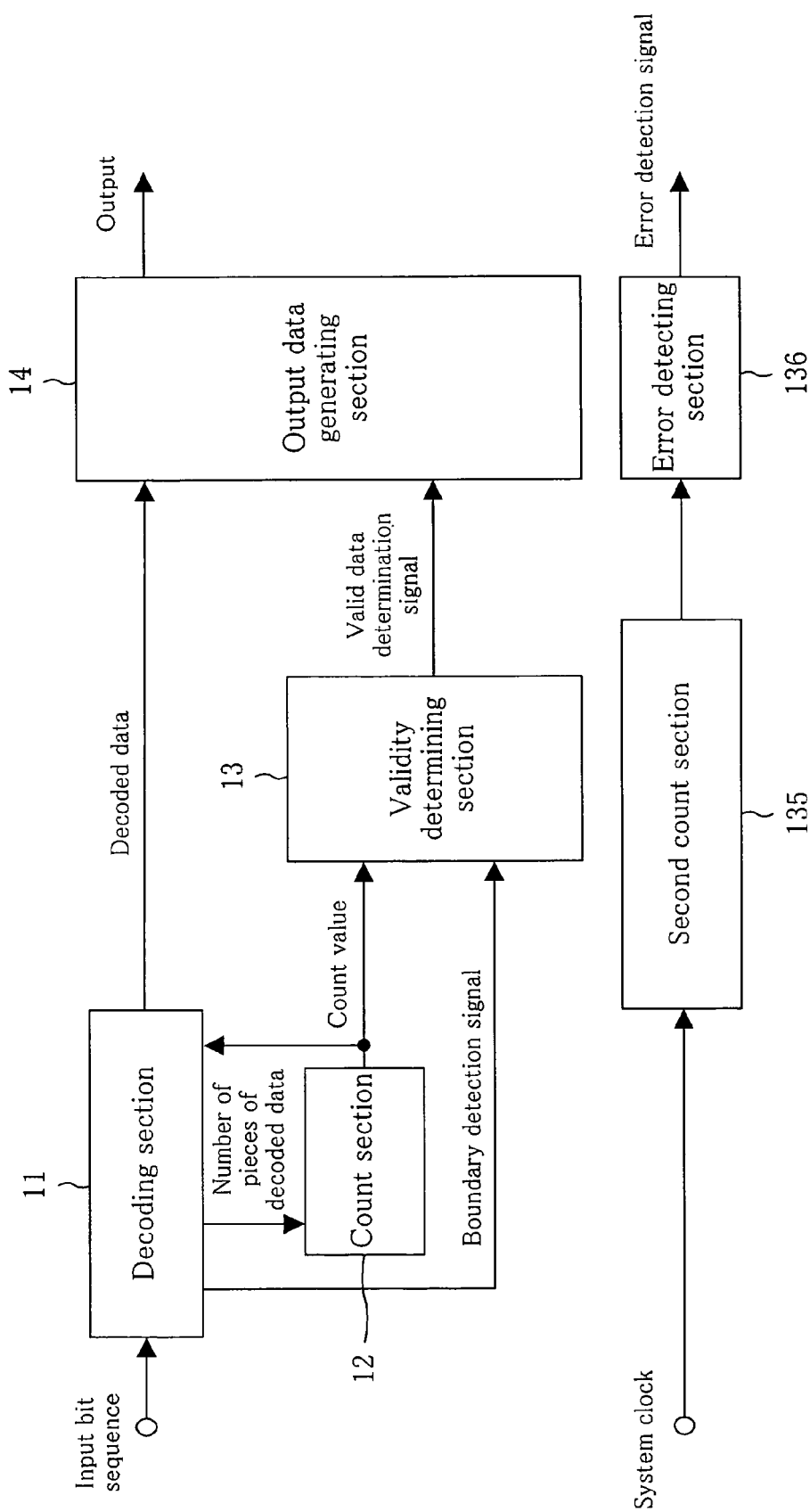
FIG. 13 is a block diagram illustrating a whole structure of a video decoding apparatus according to Embodiment 4 of the present invention.

FIG. 13 is a block diagram illustrating a whole structure of a video decoding apparatus according to Embodiment 4 of the present invention, which is different from that of Embodiment 2 only in that a second count section of counting the number of clocks of a system clock is provided. Therefore, the same parts as those of Embodiment 2 are hereinafter indicated by the same reference numerals, and only the difference will be described.

The second count section 135 counts the number of clocks of the system clock, and the count value is output to an error detecting section 136.

Figure 14:
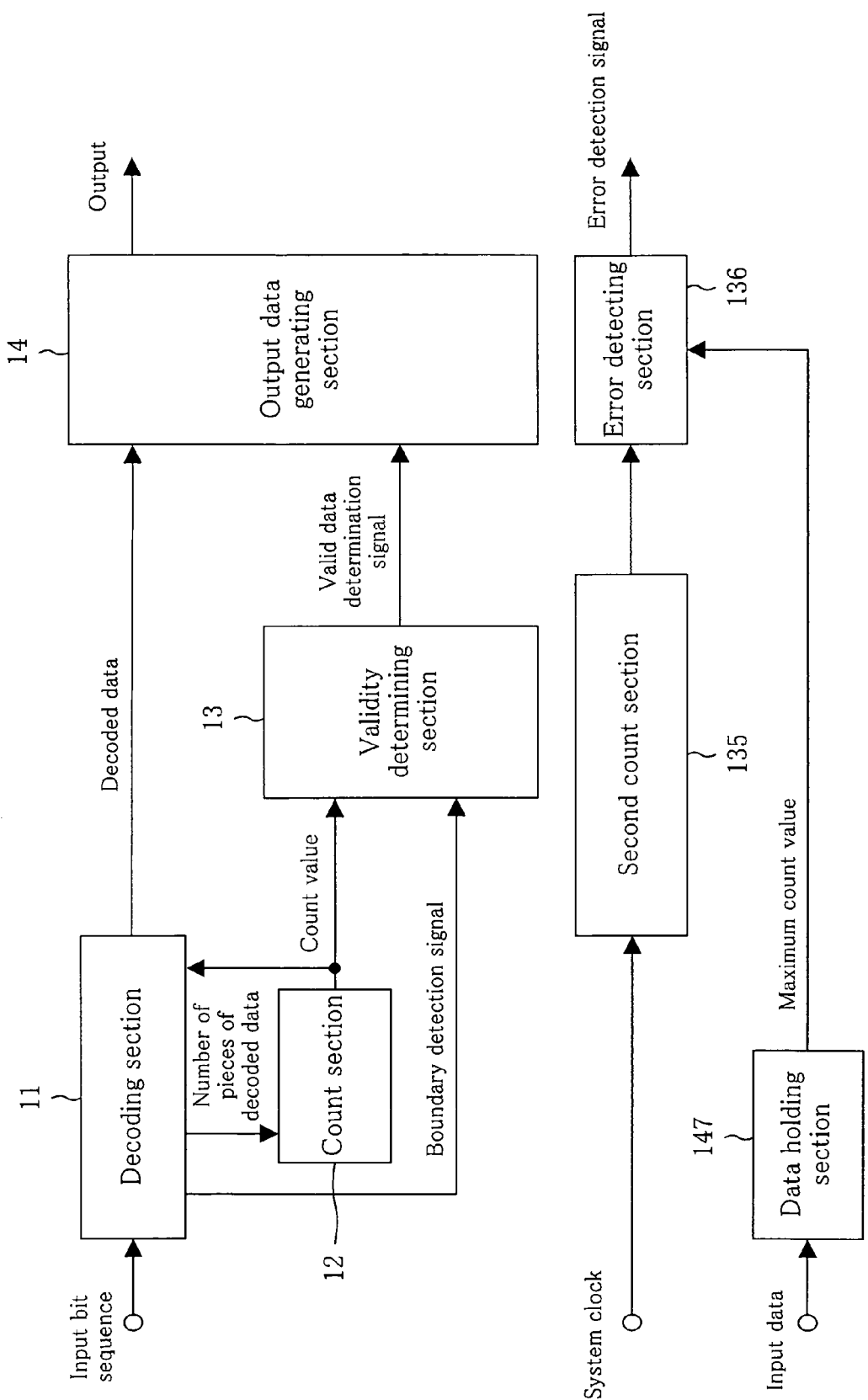
FIG. 14 is a block diagram illustrating another whole structure of a video decoding apparatus according to Embodiment 4 of the present invention.

The error detecting section 136 informs an error when the count value received from the second count section 135 exceeds a tolerable maximum value. Note that, as illustrated in FIG. 14, if a data holding section 147 is connected to the error detecting section 136, and the maximum count value is set by the data holding section 147, it is more preferable that the maximum count value can be set to be an arbitrary value. Hereinafter, a decoding process using the video decoding apparatus of FIG. 14 will be described.

Figure 15:
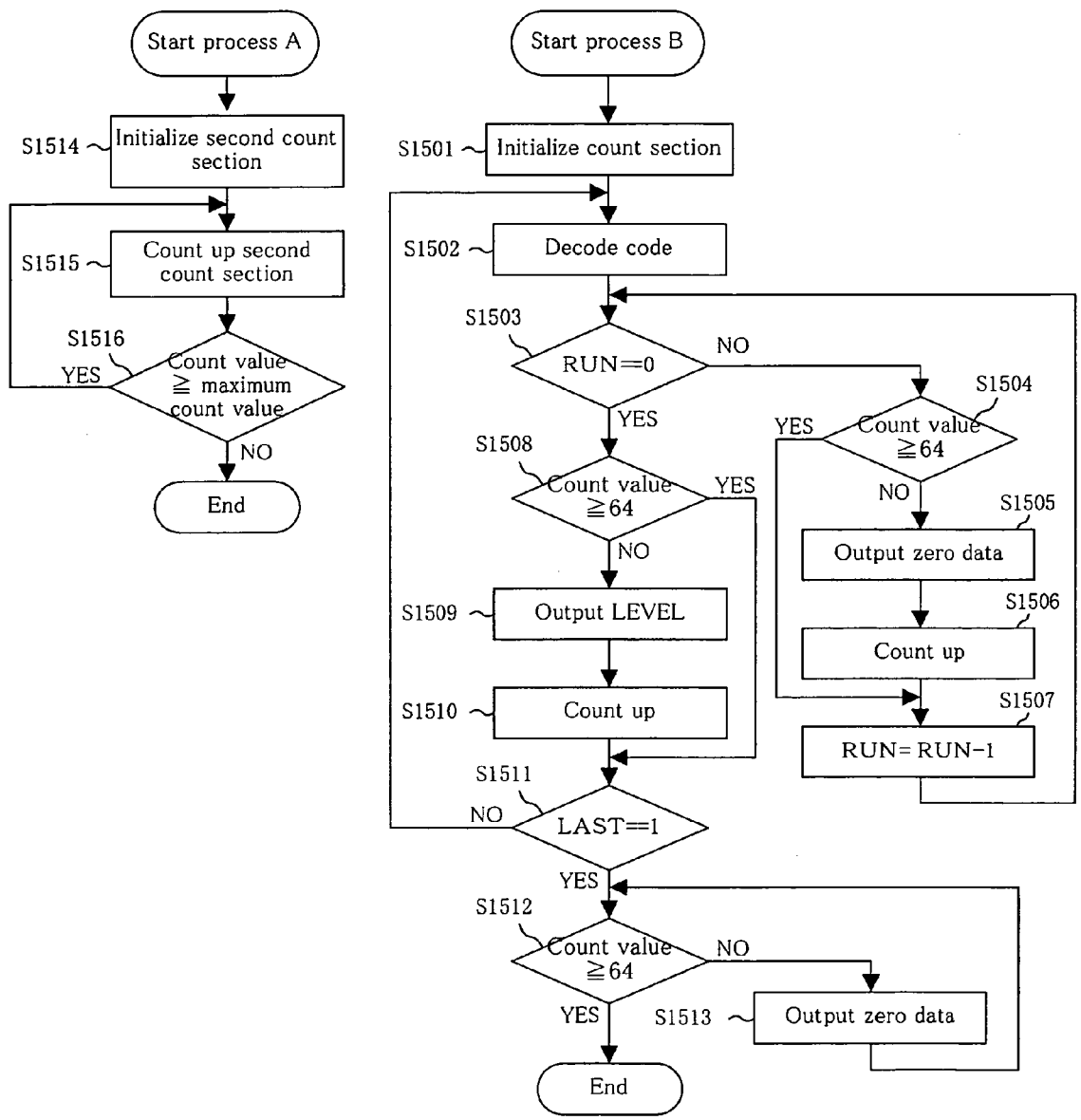
FIG. 15 is a flowchart illustrating a decoding process of Embodiment 4 of the present invention.

FIG. 15 is a flowchart illustrating a decoding process in the video decoding apparatus of Embodiment 4 of the present invention. As illustrated in FIG. 15, in Embodiment 4, a process A of counting the number of clocks in the system clock and a process B of counting the number of pieces of decoded data are processed in parallel.

In the process A, in step S1514, the count value of the count section 105 is initialized. Next, in step S1515, the number of clocks of the system clock is counted up. Thereafter, in step S1516, in the error detecting section 136, the maximum count value previously held in the data holding section 147 is compared with the count value to determine whether or not the count value is greater than the maximum count value.

When the result of the determination in step S1516 is "YES", the process goes to step S1515, in which the decoding process is continued. When the result of the determination in step S1516 is "NO", it is determined that an error occurs, an error detection signal is output from the error detecting section 136, and the decoding process is ended.

On the other hand, in the process B, in step S1501, the count value of the count section 12 is initialized. Next, in step S1502, the first code of a Block is decoded. Thereby, the values of a RUN, a LEVEL, and a LAST are obtained.

Next, in step S1503, it is determined whether or not the value of the RUN is "0". When the result of the determination in step S1503 is "NO", the process goes to step S1504. In step S1504, it is determined whether or not the count value of the count section 12 is 64 or more.

When the result of the determination in step S1504 is "NO", the process goes to step S1505, in which zero data is output to the output data generating section 14. Thereafter, the process goes to step S1506. In step S1506, the count value of the count section 12 is counted up, and thereafter, the process goes to step S1507. When the result of the determination in step S1504 is "YES", the process goes to step S1507 without outputting data.

In step S1507, the current value of the RUN is reduced by 1. Thereafter, the process returns to step S1503. By repeatedly performing such a procedure, the result of the determination in step S1503 eventually becomes "YES", and the count value of the count section 12 is counted up by the value of the RUN, and thereafter, the process goes to step S1508.

In step S1508, it is determined whether or not the count value of the count section 12 is 64 or more. When the result of the determination in step S1508 is "NO", the process goes to step S1509. In step S1509, the LEVEL (nonzero data) is output to the output data generating section 14, and thereafter, the process goes to step S1510. In step S1510, the count value of the count section 12 is counted up, and thereafter, the process goes to step S1511.

When the result of the determination in step S1508 is "YES", the process goes to step S1511. In step S1511, it is determined whether or not the value of the LAST is "1". When the result of the determination in step S1511 is "NO" (the value of the LAST is "0"), the process goes to step S1502, in which the next code is decoded. When the result of the determination in step S1511 is "YES", the process goes to step S1512.

In step S1512, it is determined whether or not the count value of the count section 12 is 64 or more. When the result of the determination in step S1512 is "NO", the process goes to step S1513. In step S1513, zero data is output to the output data generating section 14, and thereafter, the process returns to step S1512. When the result of the determination in step S1512 is "YES", the decoding of the Block is ended. By repeatedly performing such a procedure, zero data is output to the output data generating section 14 until the count value eventually reaches 64, and thereafter, the decoding is ended.

In other words, even if encoded data the value of the LAST of which is not "1" when the number of pieces of data exceeds 64 (i.e., the encoded data violates the specification) is input, the decoding process can be continued in the decoding section 11.

In addition, if a maximum count value is previously provided in the data holding section 147, an error can be informed with an arbitrary number of clocks so that the decoding process can be ended. It is effective to set the number of clocks as a maximum count value, aiming, for example, an error process in which decoding is performed or an immediately previously displayed image is provided at the same position in time for image display. In this case, concerning synchronization with encoded data, the next RSM or VOP start code is searched for and resynchronization is performed, and in place of an image skipped during that procedure, an immediately previous image displayed at the same position is displayed.

As described above, according to the video decoding apparatus of Embodiment 4 of the present invention, even when encoded data contains more than 64 pieces of data and violates the specification, decoding can be continued without losing synchronization with the encoded data. In addition, even if a code indicating a boundary is not detected and the processing of one block is not ended when encoded data the amount of which is larger than or equal to an arbitrary data amount is decoded, the error can be informed so that the decoding can be ended, and it is possible to freely set whether or not to skip an image until the next RSM or VOP start code in order to achieve synchronization of the encoded data.

In addition, an optimal maximum value can be set, taking into consideration a display time or a processing time after occurrence of an error.

Embodiment 5

Figure 16:
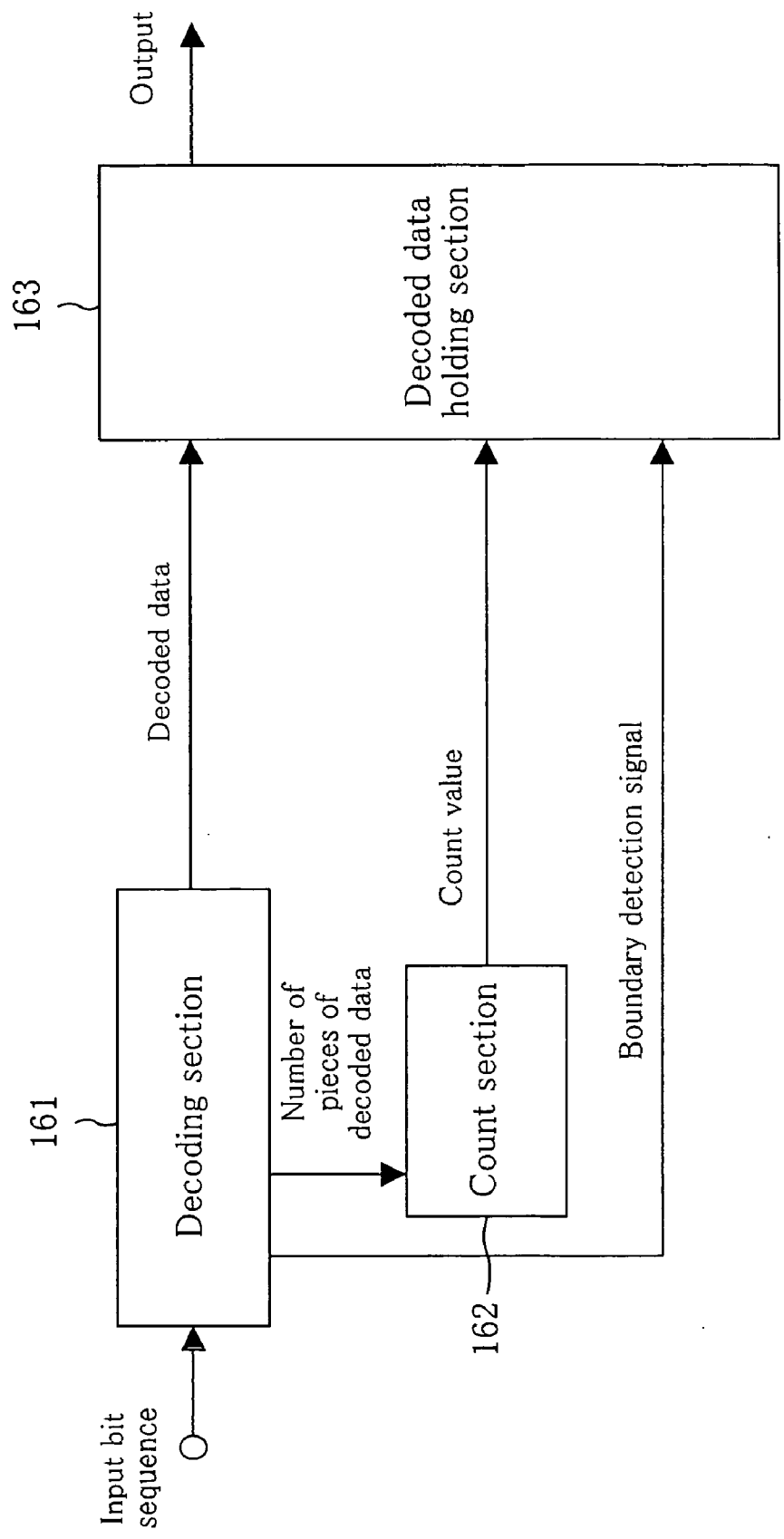
FIG. 16 is a block diagram illustrating a whole structure of a video decoding apparatus according to Embodiment 5 of the present invention.

FIG. 16 is a block diagram illustrating a whole structure of a video decoding apparatus according to Embodiment 5 of the present invention. As illustrated in FIG. 16, 161 indicates a decoding section of decoding a code bit sequence input to the video decoding apparatus. Decoded data is input to a decoded data holding section 163. The decoding section 161 outputs information about the number of pieces of decoded data obtained by decoding a code bit sequence, to a count section 162. The decoding section 161 also outputs a boundary detection signal indicating whether or not a code indicating a boundary of an MB is detected, to the decoded data holding section 163.

The count section 162 counts the number of pieces of decoded data, and outputs the count value to the decoded data holding section 163. The decoded data holding section 163 holds decoded data received from the decoding section 161 using the count value received from count section 162 as an address. Thereafter, outputting of the data may be triggered by the boundary detection signal input from the decoding section 161. For example, in the case of the MPEG4 scheme, since the number of pieces of data in one MB is 64, the decoded data holding section 163 has an area which holds 64 pieces of data.

Figure 17:
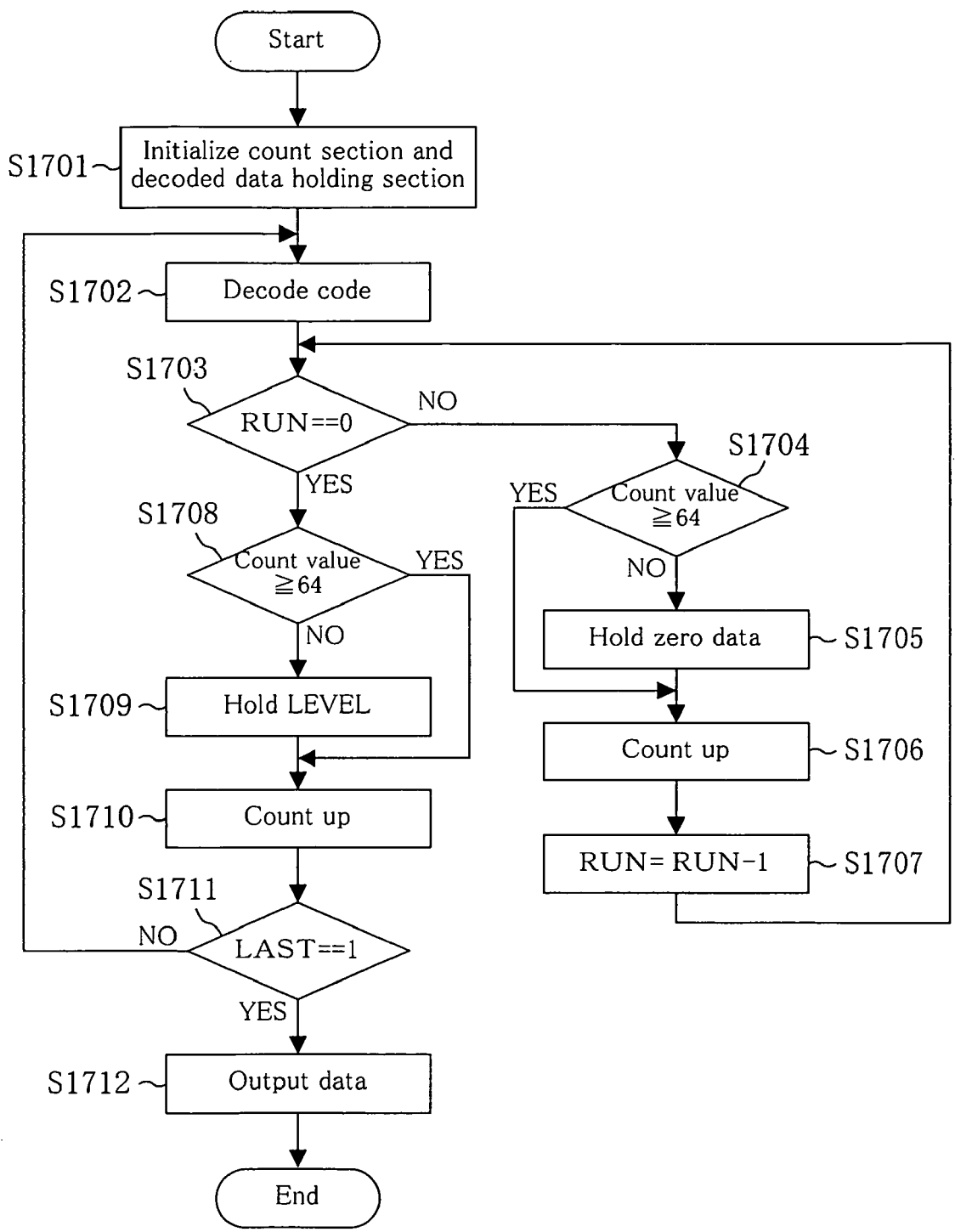
FIG. 17 is a flowchart illustrating a decoding process of Embodiment 5 of the present invention.

FIG. 17 is a flowchart illustrating a decoding process of the video decoding apparatus of Embodiment 5 of the present invention. As illustrated in FIG. 17, in step S1701, the count section 162 and the decoded data holding section 163 are each initialized. Note that the decoded data holding section 163 is preferably initialized with "0" in the case of, for example, MPEG4. Next, in step S1702, the first code of a Block is decoded. Thereby, the values of a RUN, a LEVEL, and a LAST are obtained.

Next, in step S1703, it is determined whether or not the value of the RUN is "0". When the result of the determination in step S1703 is "NO", the process goes to step S1704. In step S1704, it is determined whether or not the count value of the count section 162 is 64 or more.

When the result of the determination in step S1704 is "NO", the process goes to step S1705, in which zero data is held in the decoded data holding section 163. Thereafter, the process goes to step S1706. When the result of the determination in step S1704 is "YES", since an address which the count section 162 outputs to the decoded data holding section 163 exceeds the holding area, the process goes to step S1706 without holding data.

In step S1706, the count value of the count section 162 is counted up, and thereafter, the process goes to S1707. In step S1707, the current value of the RUN is reduced by 1. Thereafter, the process returns to step S1703. By repeatedly performing such a procedure, the result of the determination in step S1703 eventually becomes "YES", and the count value of the count section 162 is counted up by the value of the RUN, and thereafter, the process goes to step S1708.

In step S1708, it is determined whether or not the count value of the count section 162 is 64 or more. When the result of the determination in step S1708 is "NO", the process goes to step S1709. In step S1709, the LEVEL (nonzero data) is held by the decoded data holding section 163, and thereafter, the process goes to step S1710. When the result of the determination in step S1708 is "YES", the process goes to step S1710 without holding data. In step S1710, the count value of the count section 162 is counted up, and therefore, the process goes to step S1711.

In step S1711, it is determined whether or not the value of the LAST is "1". When the result of the determination in step S1711 is "NO" (the value of the LAST is "0"), the process goes to step S1702, in which the next code is decoded. When the result of the determination in step S1711 is "YES", the process goes to step S1712. In step S1712, all the data held in the decoded data holding section 163 are output, and thereafter, the decoding is ended.

In other words, even if encoded data the value of the LAST of which is not "1" when the number of pieces of data exceeds 64 (i.e., the encoded data violates the specification) is input, the decoding process can be continued in the decoding section 161.

Since the decoded data holding section 163 cannot hold 64-th data or later, the 64-th data or later is not eventually output. When the value of the LAST reaches "1", the decoded data holding section 163 outputs data, and the decoding of the Block is ended.

As described above, according to the video decoding apparatus of Embodiment 5 of the present invention, even when encoded data contains more than 64 pieces of data and violates the specification, decoding can be continued without losing synchronization with the encoded data. Therefore, it is no longer necessary to skip images until the next RSM or start code in order to achieve synchronization.

Embodiment 6

Figure 18:
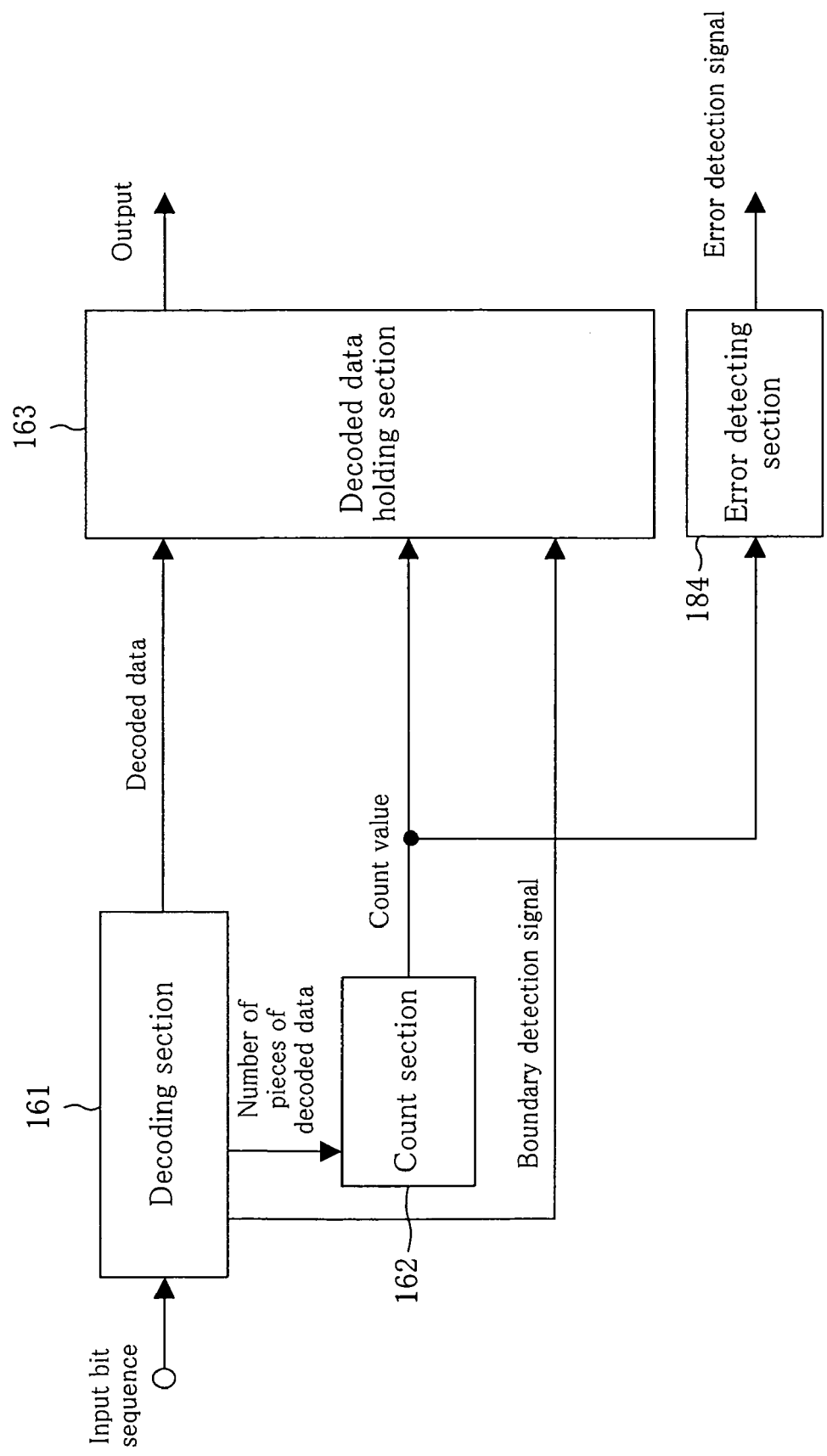
FIG. 18 is a block diagram illustrating a whole structure of a video decoding apparatus according to Embodiment 6 of the present invention.

FIG. 18 is a block diagram illustrating a whole structure of a video decoding apparatus according to Embodiment 6 of the present invention, which is different from that of Embodiment 5 only in that an error detecting section is provided. Therefore, the same parts as those of Embodiment 5 are hereinafter indicated by the same reference numerals, and only the difference will be described.

Figure 19:
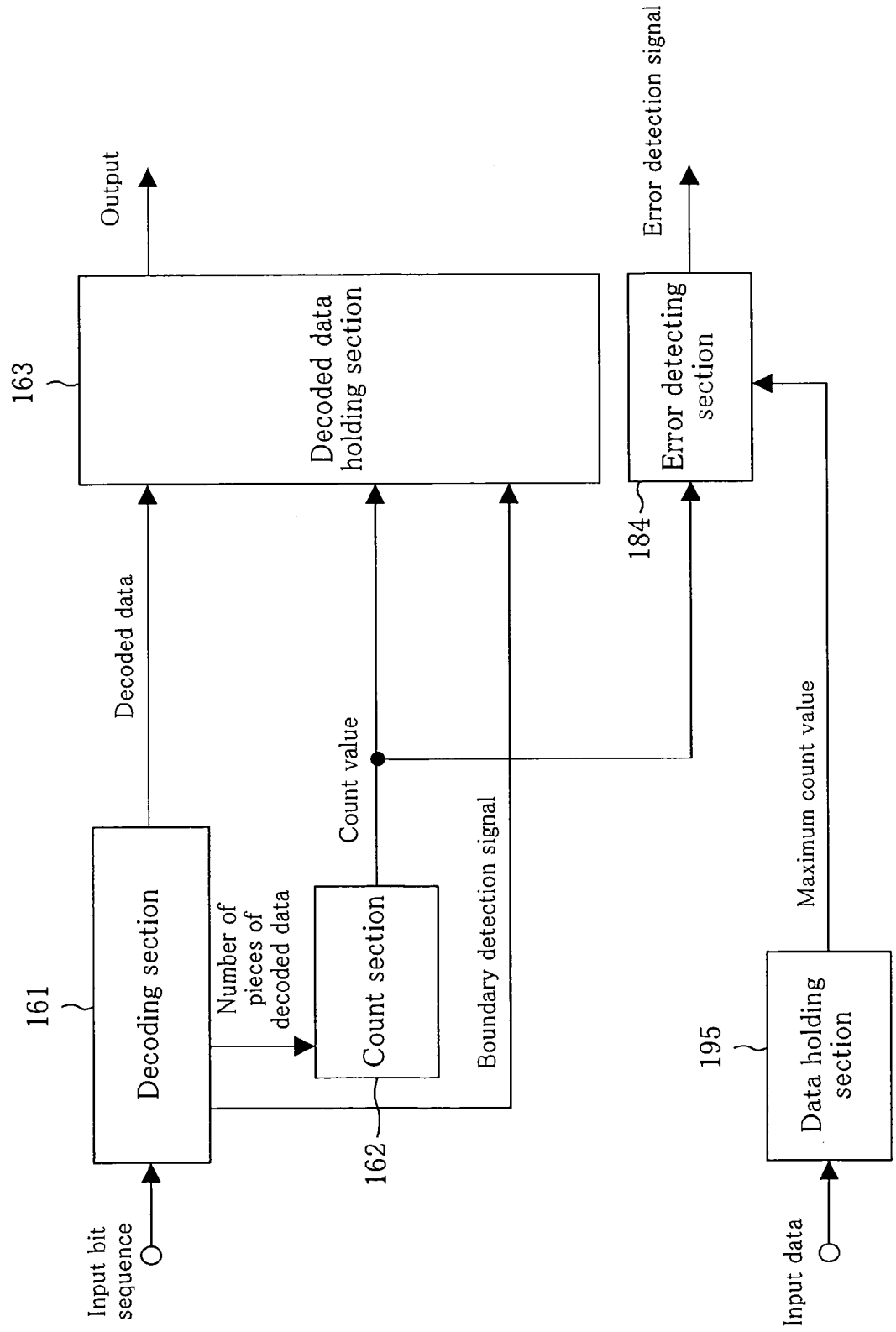
FIG. 19 is a block diagram illustrating another whole structure of a video decoding apparatus according to Embodiment 6 of the present invention.

The error detecting section 184 is connected to the count section 162, and informs an error when a count value received from the count section 162 exceeds a tolerable maximum value. Note that, as illustrated in FIG. 19, if a data holding section 195 is connected to the error detecting section 184, and the maximum count value is set by the data holding section 195, it is more preferable that the maximum count value can be set to be an arbitrary value. Hereinafter, a decoding process using the video decoding apparatus of FIG. 19 will be described.

Figure 20:
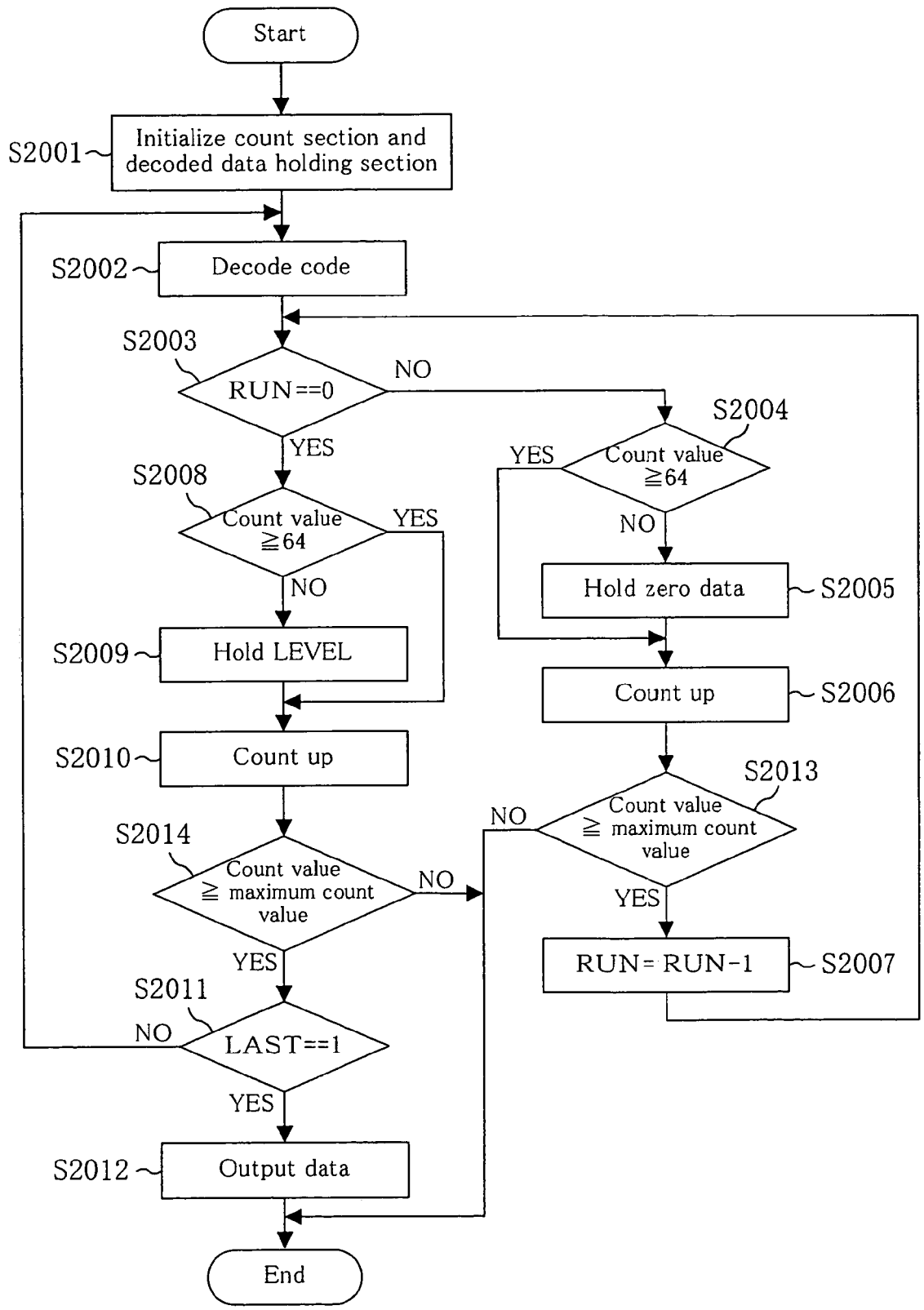
FIG. 20 is a flowchart illustrating a decoding process of Embodiment 6 of the present invention.

FIG. 20 is a flowchart illustrating a decoding process in the video decoding apparatus of Embodiment 6 of the present invention. As illustrated in FIG. 20, in step S2001, the count section 162 and the decoded data holding section 163 are each initialized. Note that the decoded data holding section 163 is preferably initialized with "0" in the case of, for example, MPEG4. Next, in step S2002, the first code of a Block is decoded. Thereby, the values of a RUN, a LEVEL, and a LAST are obtained.

Next, in step S2003, it is determined whether or not the value of the RUN is "0". When the result of the determination in step S2003 is "NO", the process goes to step S2004. In step S2004, it is determined whether or not the count value of the count section 162 is 64 or more.

When the result of the determination in step S2004 is "NO", the process goes to step S2005, in which zero data is held in the decoded data holding section 163. Thereafter, the process goes to step S2006. When the result of the determination in step S2004 is "YES", since an address which the count section 162 outputs to the decoded data holding section 163 exceeds the holding area, the process goes to step S2006 without holding data. In step S2006, the count value of the count section 162 is counted up, and thereafter, the process goes to step S2013.

In step S2013, in the error detecting section 184, the maximum count value previously held in the data holding section 195 is compared with the count value to determine whether or not the count value is greater than the maximum count value.

When the result of the determination in step S2013 is "NO", it is determined that an error occurs, an error detection signal is output from the error detecting section 184, and the decoding process is ended. When the result of the determination in step S2013 is "YES", the process goes to step S2007. In step S2007, the current value of the RUN is reduced by 1. Thereafter, the process returns to step S2003. By repeatedly performing such a procedure, the result of the determination in step S2003 eventually becomes "YES", and the count value of the count section 162 is counted up by the value of the RUN, and thereafter, the process goes to step S2008.

In step S2008, it is determined whether or not the count value of the count section 162 is 64 or more. When the result of the determination in step S2008 is "NO", the process goes to step S2009. In step S2009, the LEVEL (nonzero data) is held by the decoded data holding section 163, and thereafter, the process goes to step S2010. When the result of the determination in step S2008 is "YES", the process goes to step S2010 without holding data. In step S2010, the count value of the count section 162 is counted up, and therefore, the process goes to step S2014.

In step S2014, in the error detecting section 184, the maximum count value previously held in the data holding section 195 is compared with the count value to determine whether or not the count value is greater than the maximum count value.

When the result of the determination in step S2014 is "YES", the process goes to step S2011, in which the decoding process is continued. When the result of the determination in step S2014 is "NO", it is determined that an error occurs, an error detection signal is output from the error detecting section 184, and the decoding process is ended.

In step S2011, it is determined whether or not the value of the LAST is "1". When the result of the determination in step S2011 is "NO" (the value of the LAST is "0"), the process goes to step S2002, in which the next code is decoded. When the result of the determination in step S2011 is "YES", the process goes to step S2012. In step S2012, all the data held in the decoded data holding section 163 are output, and thereafter, the decoding is ended.

In other words, by previously providing the data holding section 195 with the maximum count value, it is possible to inform an error with an arbitrary number of pieces of decoded data to end the decoding process. In this case, concerning synchronization with encoded data, the next RSM or VOP start code is searched for and resynchronization is performed, and in place of an image skipped during that procedure, an immediately previous image displayed at the same position is displayed.

As described above, according to the video decoding apparatus of Embodiment 6 of the present invention, even when encoded data contains more than 64 pieces of data and violates the specification, decoding can be continued without losing synchronization with the encoded data. In addition, even if a code indicating a boundary is not detected and the processing of one block is not ended when encoded data the amount of which is larger than or equal to an arbitrary data amount is decoded, the error can be informed so that the decoding can be ended, and it is possible to freely set whether or not to skip an image until the next RSM or start code in order to achieve synchronization of the encoded data.

Embodiment 7

Figure 21:
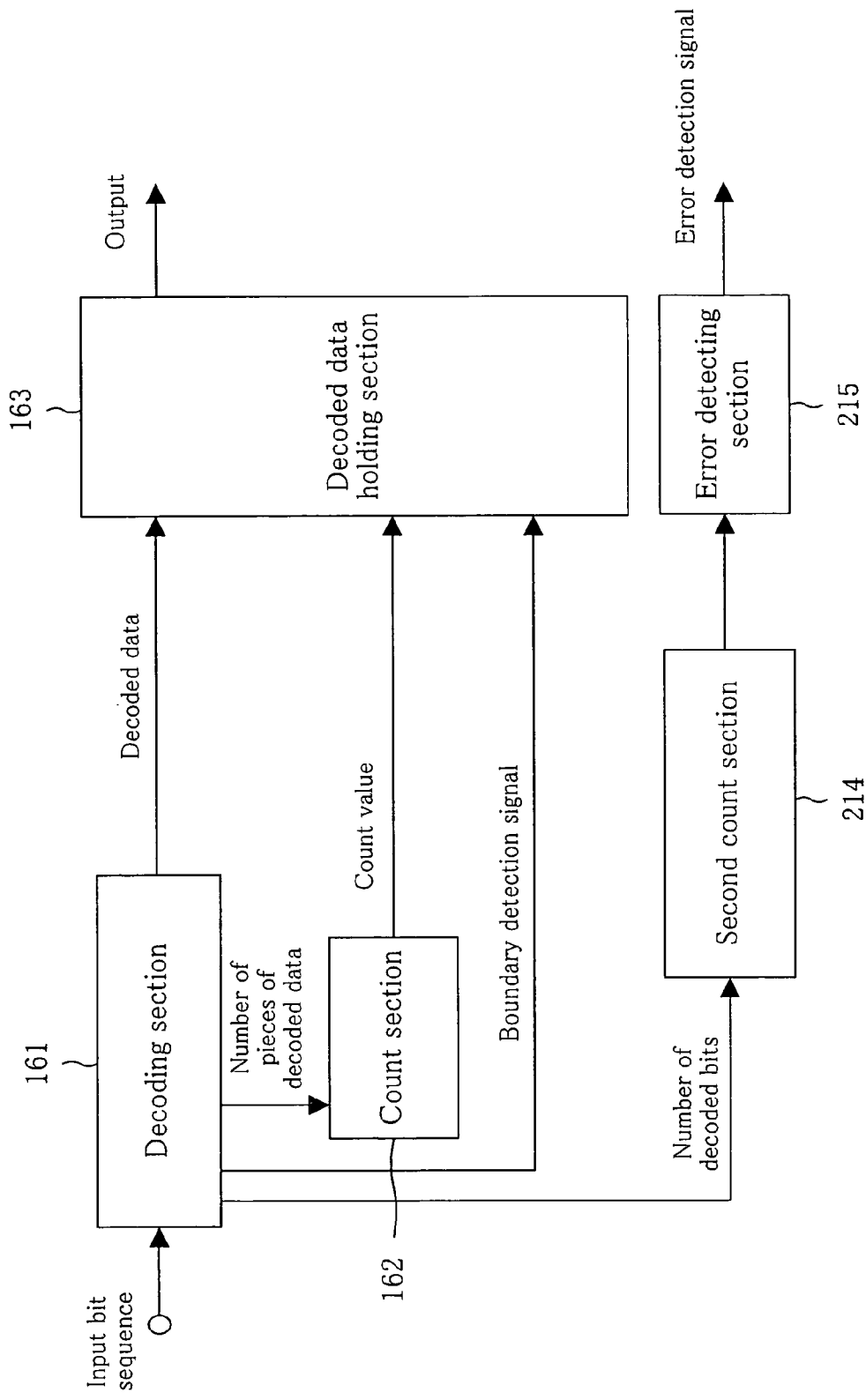
FIG. 21 is a block diagram illustrating a whole structure of a video decoding apparatus according to Embodiment 7 of the present invention.

FIG. 21 is a block diagram illustrating a whole structure of a video decoding apparatus according to Embodiment 7 of the present invention, which is different from that of Embodiment 6 only in that a second count section of counting the number of bits of encoded data is provided. Therefore, the same parts as those of Embodiment 6 are hereinafter indicated by the same reference numerals, and only the difference will be described.

The second count section 214 is connected to the decoding section 161, and counts the number of bits in encoded data which are consumed when the encoded data is decoded in the decoding section 161. Thereafter, a count value output from the second count section 214 is input to an error detecting section 215.

Figure 22:
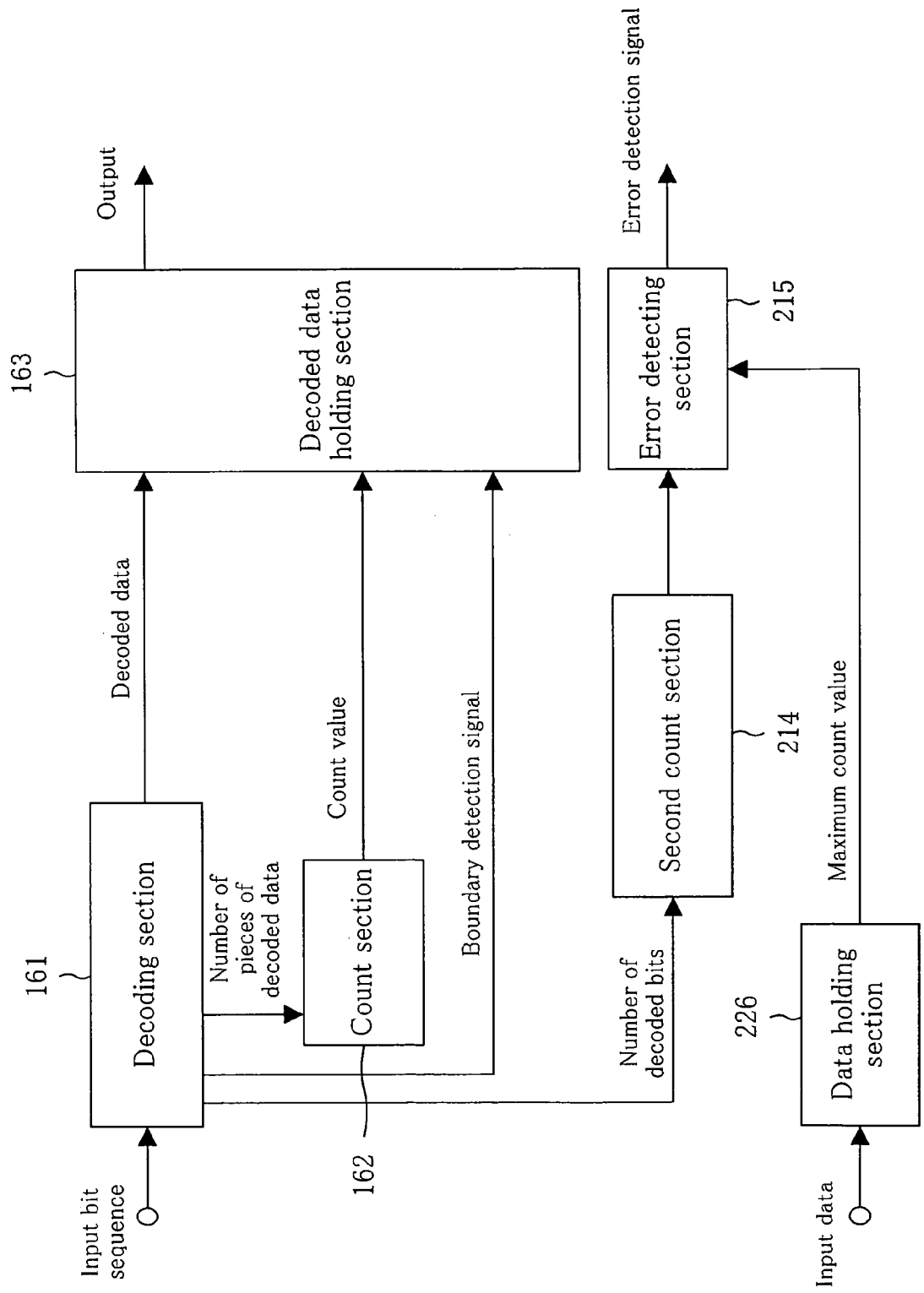
FIG. 22 is a block diagram illustrating another whole structure of a video decoding apparatus according to Embodiment 7 of the present invention.

The error detecting section 215 informs an error when the count value received from the second count section 214 exceeds a tolerable maximum value. Note that, as illustrated in FIG. 22, if a data holding section 226 is connected to the error detecting section 215, and the maximum count value is set by the data holding section 226, it is more preferable that the maximum count value can be set to be an arbitrary value. Hereinafter, a decoding process using the video decoding apparatus of FIG. 22 will be described.

Figure 23:
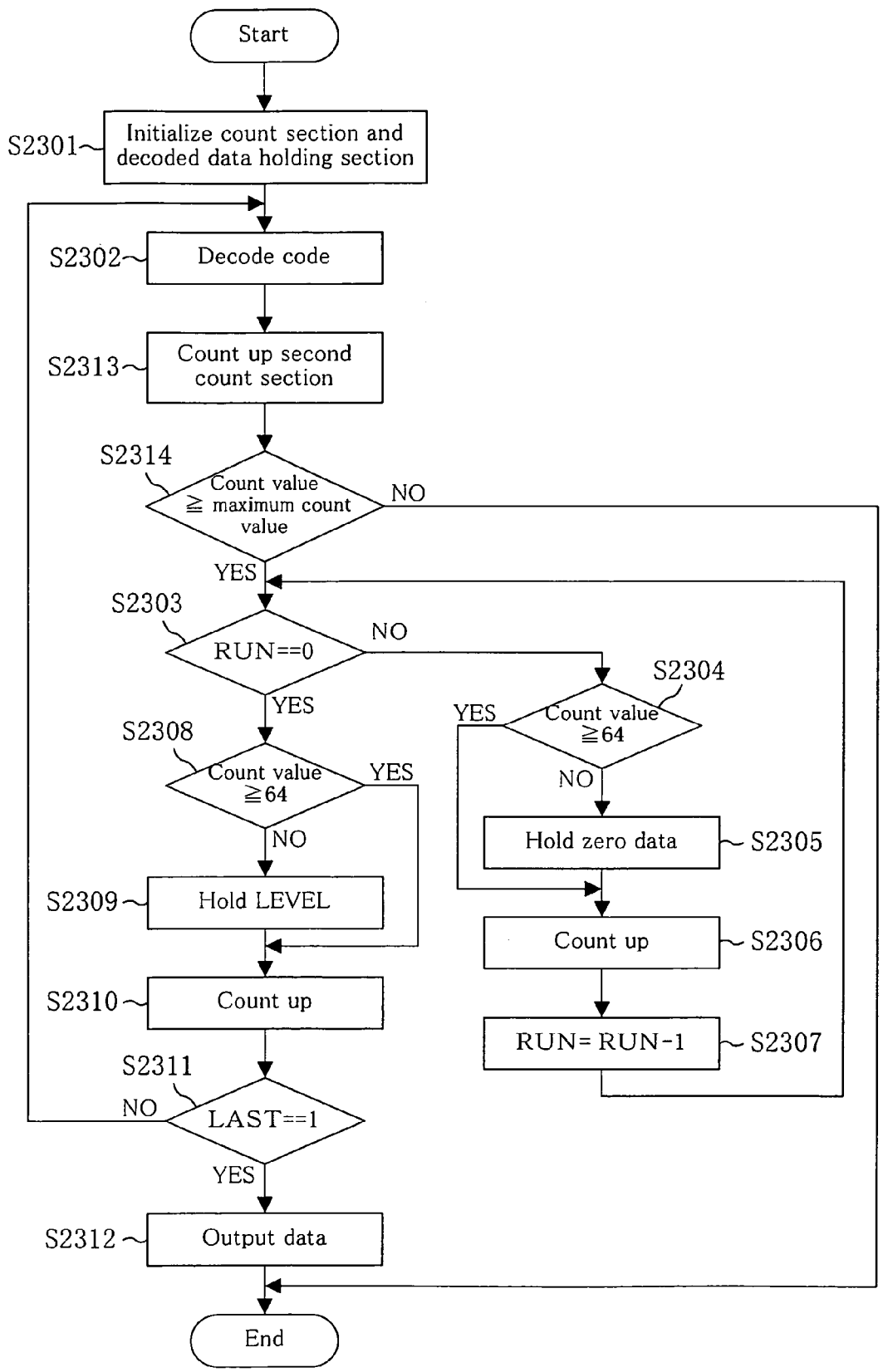
FIG. 23 is a flowchart illustrating a decoding process of Embodiment 7 of the present invention.

FIG. 23 is a flowchart illustrating a decoding process in the video decoding apparatus of Embodiment 7 of the present invention. As illustrated in FIG. 23, in step S2301, the count section 162 and the second count section 163 are initialized. Next, in step S2302, the first code of a Block is decoded. Thereby, the values of a RUN, a LEVEL, and a LAST are obtained.

Next, in step S2313, the second count section 214 is counted up by the number of bits in the decoded encoded data. Thereafter, in step S2314, in the error detecting section 215, the maximum count value previously held in the data holding section 226 is compared with the count value to determine whether or not the count value is greater than the maximum count value.

When the result of the determination in step S2314 is "YES", the process goes to step S2303, in which the decoding process is continued. When the result of the determination in step S2314 is "NO", it is determined that an error occurs, an error detection signal is output from the error detecting section 215, and the decoding process is ended.

Next, in step S2303, it is determined whether or not the value of the RUN is "0". When the result of the determination in step S2303 is "NO", the process goes to step S2304. In step S2304, it is determined whether or not the count value of the count section 162 is 64 or more.

When the result of the determination in step S2304 is "NO", the process goes to step S2305, in which zero data is held in the decoded data holding section 163. Thereafter, the process goes to step S2306. When the result of the determination in step S2304 is "YES", since an address which the count section 162 outputs to the decoded data holding section 163 exceeds the holding area, the process goes to step S2306 without holding data. In step S2306, the count value of the count section 162 is counted up, and thereafter, the process goes to step S2307.

Next, in step S2307, the current value of the RUN is reduced by 1. Thereafter, the process returns to step 2303. By repeatedly performing such a procedure, the result of the determination in step S2303 eventually becomes "YES", and the count value of the count section 162 is counted up by the value of the RUN, and thereafter, the process goes to step S2308.

In step S2308, it is determined whether or not the count value of the count section 162 is 64 or more. When the result of the determination in step S2308 is "NO", the process goes to step S2309. In step S2309, the LEVEL (nonzero data) is held in the decoded data holding section 163, and thereafter, the process goes to step S2310. When the result of the determination in step S2308 is "YES", the process goes to step S2310 without holding data. In step S2310, the count value of the count section 162 is counted up. Thereafter, the process goes to step S2311.

In step S2311, it is determined whether or not the value of the LAST is "1". When the result of the determination in step S2311 is "NO" (the value of the LAST is "0"), the process goes to step S2302, in which the next code is decoded. When the result of the determination in step S2311 is "YES", the process goes to step S2312. In step S2312, all the data held in the decoded data holding section 163 are output, and thereafter, the decoding is ended.

In other words, if a maximum count value is previously provided in the data holding section 226, an error can be informed with an arbitrary number of pieces of data so that the decoding process can be ended. For example, in MPEG4, since an RSM is provided every a constant length of bits, and therefore, the decoding of one Block cannot be continued for bits the number of which is larger than or equal to the RSM interval. Therefore, it is effective that the maximum count value is set to be the RSM interval. In this case, concerning synchronization with encoded data, the next RSM or VOP start code is searched for and resynchronization is performed, and in place of an image skipped during that procedure, an immediately previous image displayed at the same position is displayed.

As described above, according to the video decoding apparatus of Embodiment 7 of the present invention, even when encoded data contains more than 64 pieces of data and violates the specification, decoding can be continued without losing synchronization with the encoded data. In addition, even if a code indicating a boundary is not detected and the processing of one block is not ended when encoded data the amount of which is larger than or equal to an arbitrary data amount is decoded, the error can be informed so that the decoding can be ended, and it is possible to freely set whether or not to skip an image until the next RSM or VOP start code in order to achieve synchronization of the encoded data. In addition, an optimal maximum value can be set using the code bit structure.

Embodiment 8

Figure 24:
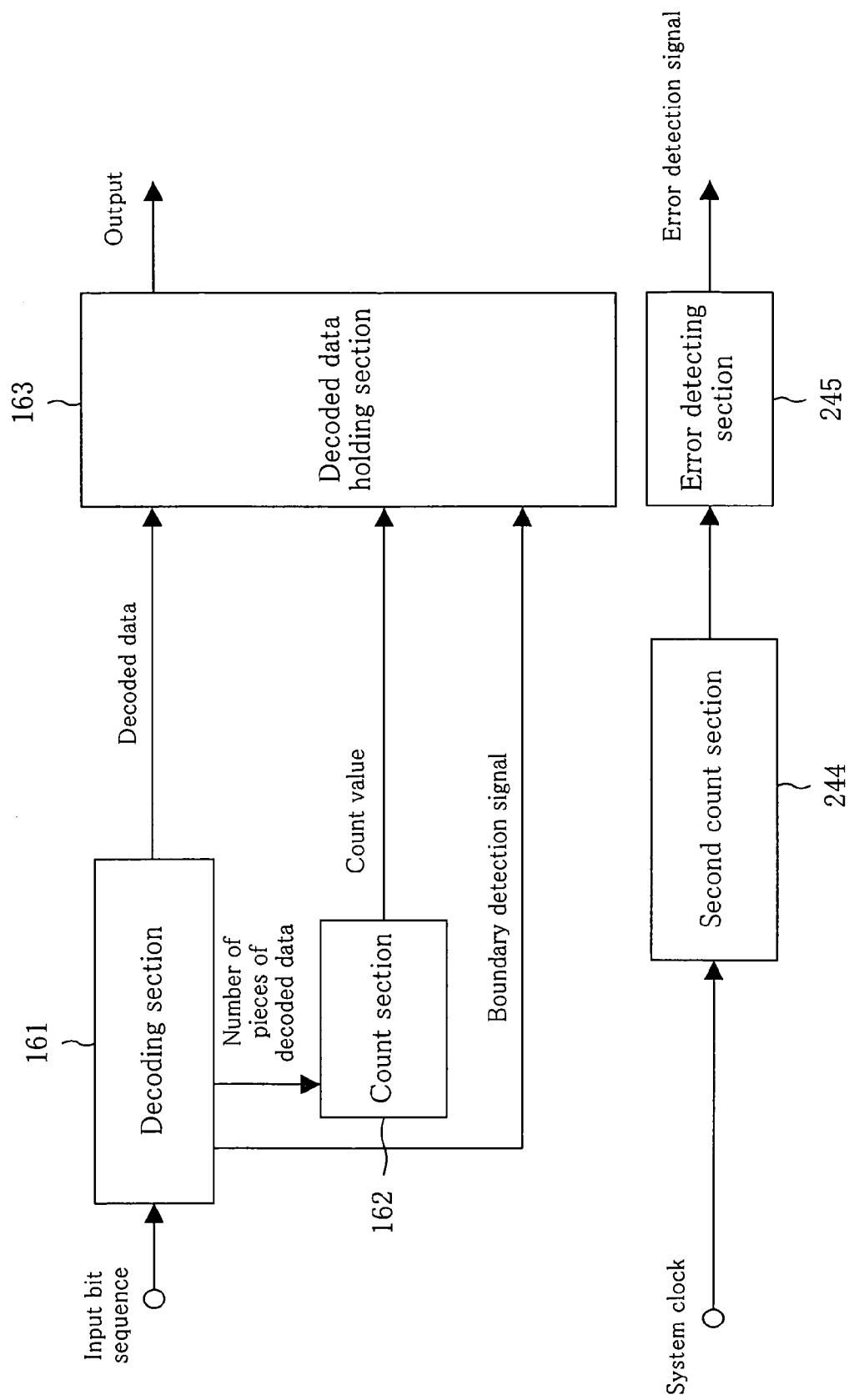
FIG. 24 is a block diagram illustrating a whole structure of a video decoding apparatus according to Embodiment 8 of the present invention.

FIG. 24 is a block diagram illustrating a whole structure of a video decoding apparatus according to Embodiment 8 of the present invention, which is different from that of Embodiment 6 only in that a second count section of counting the number of clocks of a system clock is provided. Therefore, the same parts as those of Embodiment 6 are hereinafter indicated by the same reference numerals, and only the difference will be described.

The second count section 244 counts the number of clocks of the system clock, and the count value is output to an error detecting section 245.

Figure 25:
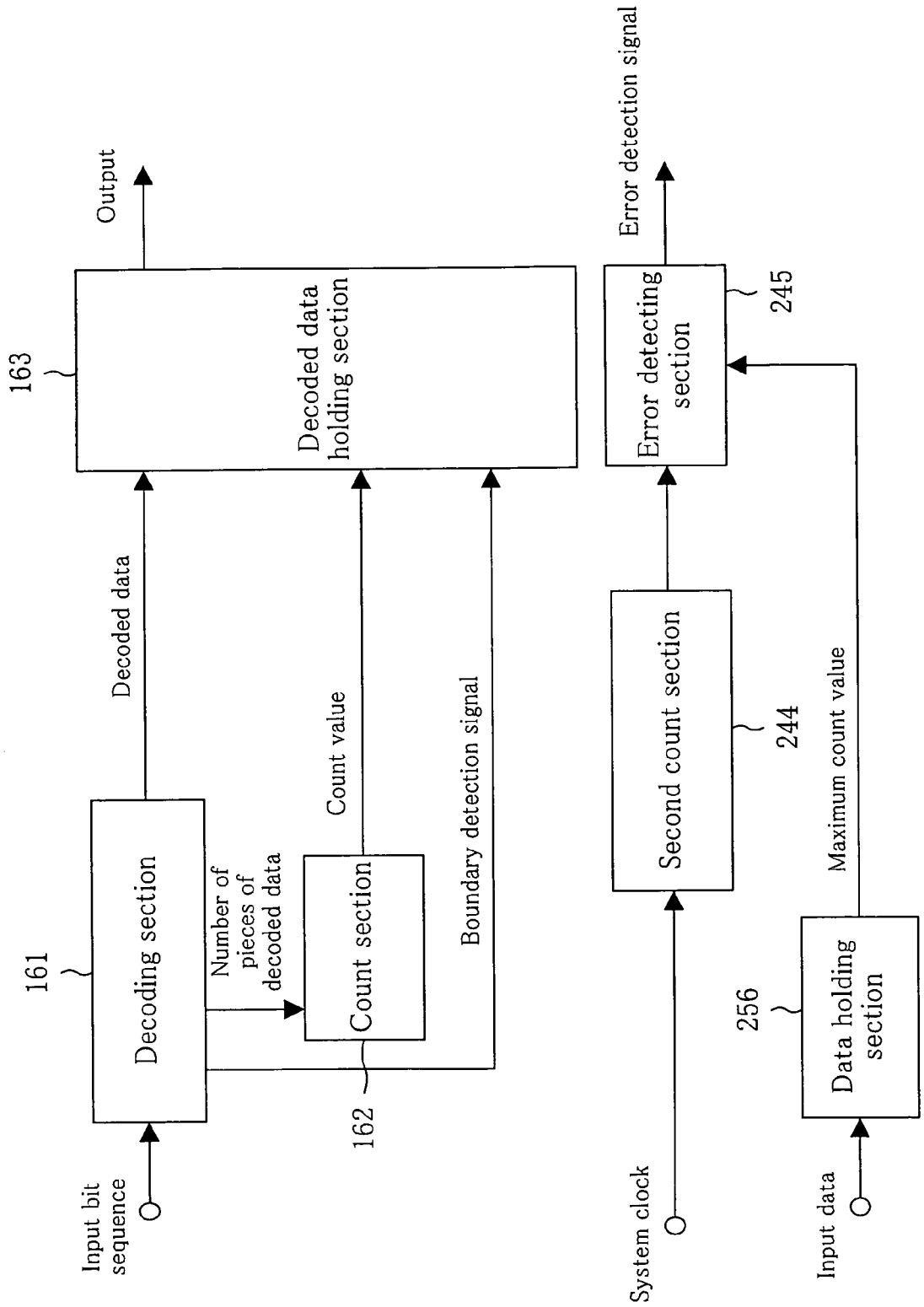
FIG. 25 is a block diagram illustrating another whole structure of a video decoding apparatus according to Embodiment 8 of the present invention.

The error detecting section 245 informs an error when the count value received from the second count section 244 exceeds a tolerable maximum value. Note that, as illustrated in FIG. 25, if a data holding section 256 is connected to the error detecting section 245, and the maximum count value is set by the data holding section 256, it is more preferable that the maximum count value can be set to be an arbitrary value. Hereinafter, a decoding process using the video decoding apparatus of FIG. 25 will be described.

Figure 26:
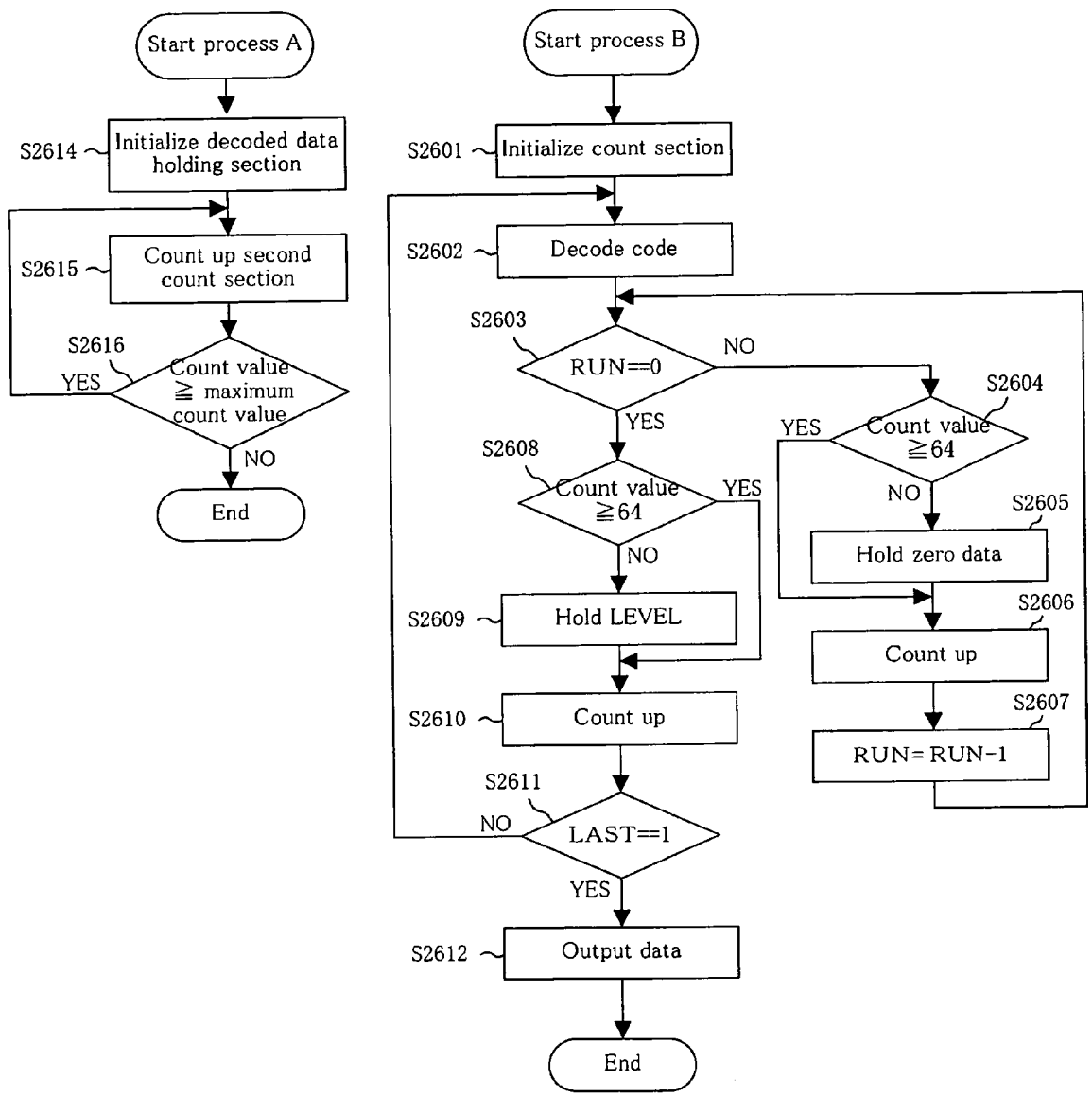
FIG. 26 is a flowchart illustrating a decoding process of Embodiment 8 of the present invention.

FIG. 26 is a flowchart illustrating a decoding process in the video decoding apparatus of Embodiment 8 of the present invention. As illustrated in FIG. 26, in Embodiment 8, a process A of counting the number of clocks in the system clock and a process B of counting the number of pieces of decoded data are processed in parallel.

In the process A, in step S2614, the decoded data holding section 163 is initialized. Note that the decoded data holding section 163 is preferably initialized with "0" in the case of, for example, MPEG4. Next, in step S2615, the number of clocks of the system clock is counted up in the second count section 244. Thereafter, in step S2616, in the error detecting section 245, the maximum count value previously held in the data holding section 256 is compared with the count value to determine whether or not the count value is greater than the maximum count value.

When the result of the determination in step S2616 is "YES", the process goes to step S2615, in which the decoding process is continued. When the result of the determination in step S2616 is "NO", it is determined that an error occurs, an error detection signal is output from the error detecting section 245, and the decoding process is ended.

On the other hand, in the process B, in step S2601, the count value of the count section 162 is initialized. Next, in step S2602, the first code of a Block is decoded. Thereby, the values of a RUN, a LEVEL, and a LAST are obtained.

Next, in step S2603, it is determined whether or not the value of the RUN is "0". When the result of the determination in step S2603 is "NO", the process goes to step S2604. In step S2604, it is determined whether or not the count value of the count section 162 is 64 or more.

When the result of the determination in step S2604 is "NO", the process goes to step S2605, in which zero data is held in the decoded data holding section 163. Thereafter, the process goes to step S2606. When the result of the determination in step S2604 is "YES", since an address which the count section 162 outputs to the decoded data holding section 163 exceeds the holding area, the process goes to step S2306 without holding data. In step S2606, the count value of the count section 162 is counted up, and thereafter, the process goes to step S2607.

In step S2607, the current value of the RUN is reduced by 1. Thereafter, the process returns to step 2603. By repeatedly performing such a procedure, the result of the determination in step S2603 eventually becomes "YES", and the count value of the count section 162 is counted up by the value of the RUN, and thereafter, the process goes to step S2608.

In step S2608, it is determined whether or not the count value of the count section 162 is 64 or more. When the result of the determination in step S2608 is "NO", the process goes to step S2609. In step S2609, the LEVEL (nonzero data) is held in the decoded data holding section 163, and thereafter, the process goes to step S2610. When the result of the determination in step S2608 is "YES", the process goes to step S2610 without holding data. In step S2610, the count value of the count section 162 is counted up. Thereafter, the process goes to step S2611.

In step S2611, it is determined whether or not the value of the LAST is "1". When the result of the determination in step S2611 is "NO" (the value of the LAST is "0"), the process goes to step S2602, in which the next code is decoded. When the result of the determination in step S2611 is "YES", the process goes to step S2612. In step S2612, all the data held in the decoded data holding section 163 are output, and thereafter, the decoding is ended.

In other words, if a maximum count value is previously provided in the data holding section 256, an error can be informed with an arbitrary number of clocks so that the decoding process can be ended. For example, since a display time of an image is fixed, it is effective to set the maximum count value to be the number of clocks at which, for example, an image is not visually skipped. In this case, concerning synchronization with encoded data, the next RSM or VOP start code is searched for and resynchronization is performed, and in place of an image skipped during that procedure, an immediately previous image displayed at the same position is displayed.

As described above, according to the video decoding apparatus of Embodiment 8 of the present invention, even when encoded data contains more than 64 pieces of data and violates the specification, decoding can be continued without losing synchronization with the encoded data. In addition, even if a code indicating a boundary is not detected and the processing of one block is not ended when encoded data the amount of which is larger than or equal to an arbitrary data amount is decoded, the error can be informed so that the decoding can be ended, and it is possible to freely set whether or not to skip an image until the next RSM or VOP start code in order to achieve synchronization of the encoded data. In addition, an optimal maximum value can be set, taking into consideration a display time or a processing time after occurrence of an error.

The video decoding apparatus of the present invention achieves a highly practical effect of enhancing error resistance in decoding a vide, and therefore, is considerably useful and has a high level of industrial applicability.

What is claimed is:

1. A video decoding apparatus of receiving and decoding a bit sequence obtained by encoding a block composed of M×N (M and N are natural numbers) pieces of image data, comprising:

a decoding section of decoding the encoded image data to output decoded data, and when detecting a code indicating a block boundary present in the bit sequence, outputting a boundary detection signal;

a count section of counting a number of pieces of data decoded by the decoding section;

a validity determining section of determining whether the decoded data is valid or invalid, based on a count value of the count section and the boundary detection signal; and an output data generating section of selecting and outputting only valid data among the decoded data, based on a result of the determination by the validity determining section, wherein, when the count value is M×N or less and the code indicating the block boundary is detected, the decoding section starts a decoding process of the next block after ending an M×N-th decoding process of the bit sequence, if the code indicating the block boundary is not detected when the count value is M×(N+1) or more, the decoding section continues a decoding process until the code indicating the block boundary is detected, and the validity determining section determines that M×N-th or earlier data among the decoded data are valid and M×(N+1)-th or later data among the decoded data are invalid.

2. The apparatus of claim 1, further comprising:

an error detecting section of detecting that the count value is a predetermined value or more, wherein the error detecting section informs an error if the code indicating the block boundary is not detected when the count value reaches the predetermined value.

3. The apparatus of claim 2, further comprising:

a data holding section of holding the predetermined value, wherein the error detecting section detects an error by comparing the predetermined value held by the data holding section with the count value of the count section.

4. The apparatus of claim 2, further comprising:

a second count section of counting the number of bits of the bit sequence decoded by the decoding section, wherein, if the code indicating the block boundary is not detected when the count value of the second count section reaches the predetermined value, the error detecting section informs an error.

5. The apparatus of claim 4, further comprising:

a data holding section of holding the predetermined value, wherein the error detecting section detects an error by comparing the predetermined value held by the data holding section with the count value of the second count section.

6. The apparatus of claim 2, further comprising:

a second count section of counting a number of clocks of a system clock from a time when the decoding section starts a decoding process, wherein, if the code indicating the block boundary is not detected when the count value of the second count section reaches the predetermined value, the error detecting section informs an error.

7. The apparatus of claim 6, further comprising:

a data holding section of holding the predetermined value, wherein the error detecting section detects an error by comparing the predetermined value held by the data holding section with the count value of the second count section.

8. A video decoding apparatus of receiving and decoding a bit sequence obtained by encoding a block composed of M×N (M and N are natural numbers) pieces of image data, comprising:

a decoding section of decoding the encoded image data to output decoded data, and when detecting a code indicating a block boundary present in the bit sequence, outputting a boundary detection signal;

a count section of counting a number of pieces of data decoded by the decoding section;

a decoded data holding section of successively holding M×N pieces of decoded data output by the decoding section using the count value of the count section as an address, wherein, when the count value is M×N or less and the code indicating the block boundary is detected, the decoding section starts a decoding process of the next block after ending an M×N-th decoding process of the bit sequence, if the code indicating the block boundary is not detected when the count value is M×(N+1) or more, the decoding section continues a decoding process until the code indicating the block boundary is detected, and the decoded data holding section does not hold the M×(N+1)-th or later decoded data, and when the code indicating the block boundary is not detected, outputs the currently held decoded data.

9. The apparatus of claim 8, further comprising:

an error detecting section of detecting that the count value is a predetermined value or more, wherein the error detecting section informs an error if the code indicating the block boundary is not detected when the count value reaches the predetermined value.

10. The apparatus of claim 9, further comprising:

a data holding section of holding the predetermined value, wherein the error detecting section detects an error by comparing the predetermined value held by the data holding section with the count value of the count section.

11. The apparatus of claim 9, further comprising:

a second count section of counting the number of bits of the bit sequence decoded by the decoding section, wherein, if the code indicating the block boundary is not detected when the count value of the second count section reaches the predetermined value, the error detecting section informs an error.

12. The apparatus of claim 11, further comprising:

a data holding section of holding the predetermined value, wherein the error detecting section detects an error by comparing the predetermined value held by the data holding section with the count value of the second count section.

13. The apparatus of claim 9, further comprising:

a second count section of counting a number of clocks of a system clock from a time when the decoding section starts a decoding process, wherein, if the code indicating the block boundary is not detected when the count value of the second count section reaches the predetermined value, the error detecting section informs an error.

14. The apparatus of claim 13, further comprising:

a data holding section of holding the predetermined value, wherein the error detecting section detects an error by comparing the predetermined value held by the data holding section with the count value of the second count section.

* * * * *